(12) United States Patent
Shatz et al.

(10) Patent No.: US 8,145,656 B2
(45) Date of Patent: Mar. 27, 2012

(54) MATCHING OF MODIFIED VISUAL AND AUDIO MEDIA

(75) Inventors: Amir Shatz, Tzur-Igaal (IL); Yosef Wexler, Shimshit (IL); Ran A. Cohen, Kerem Maharal (IL); Dan Raudnitz, Hod-Hasharon (IL)

(73) Assignee: Mobixell Networks Ltd., Ra'anana (IL)

( * ) Notice: Subject to any disclaimer, the term of this patent is extended or adjusted under 35 U.S.C. 154(b) by 389 days.

(21) Appl. No.: 12/162,176

(22) PCT Filed: Feb. 4, 2007

(86) PCT No.: PCT/IL2007/000138
§ 371 (c)(1),
(2), (4) Date: Oct. 6, 2008

(87) PCT Pub. No.: WO2007/091243
PCT Pub. Date: Aug. 16, 2007

(65) Prior Publication Data
US 2009/0083228 A1    Mar. 26, 2009

Related U.S. Application Data

(60) Provisional application No. 60/771,536, filed on Feb. 7, 2006.

(51) Int. Cl.
*G06F 7/00* (2006.01)
(52) U.S. Cl. ........ 707/758; 707/707; 707/728; 707/736; 707/913; 382/103; 382/165; 382/181

(58) Field of Classification Search .......... 707/999.001–999.003, 707, 728, 730, 736, 748, 758; 715/741; 386/241, 157; 706/15; 382/103, 165, 181
See application file for complete search history.

(56) References Cited

U.S. PATENT DOCUMENTS
5,393,057 A    2/1995    Marnell, II
(Continued)

FOREIGN PATENT DOCUMENTS
WO    WO-0193161    12/2001
(Continued)

OTHER PUBLICATIONS

Chang et al., "RIME: A replicated image detector for the world-wide web" proc. of SPIE Symp. on Voice, Video and Data Communications, Nov. 1998, pp. 58-67, (Boston, Massachusetts).

(Continued)

*Primary Examiner* — Dennis Truong
(74) *Attorney, Agent, or Firm* — D. Kligler IP Services Ltd.

(57) ABSTRACT

A method for matching media objects includes receiving a plurality of reference objects, and computing respective reference feature vectors (104, 106) of one or more of the reference image frames (86, 88) in each of the reference objects. Upon receiving a query object, a respective query feature vector (110) of at least one of the query image frames is computed. The reference feature vectors are searched to find one or more candidate objects among the reference objects, such that a respective reference feature vector of one of the reference image frames in each of the one or more candidate objects matches the query feature vector. At least one additional reference image frame is compared to at least one additional query image frame in order to determine that one of the candidate objects is a match for the query object.

18 Claims, 9 Drawing Sheets

U.S. PATENT DOCUMENTS

| | | | |
|---|---|---|---|
| 5,429,361 A | 7/1995 | Raven et al. | |
| 5,482,289 A | 1/1996 | Weingardt | |
| 5,518,253 A | 5/1996 | Pocock et al. | |
| 5,624,119 A | 4/1997 | Leake | |
| 5,655,961 A | 8/1997 | Acres et al. | |
| 5,727,786 A | 3/1998 | Weingardt | |
| 5,755,619 A | 5/1998 | Matsumoto et al. | |
| 5,819,219 A | 10/1998 | De Vos et al. | |
| 5,833,540 A | 11/1998 | Miodunski et al. | |
| 5,857,911 A | 1/1999 | Fioretti | |
| 5,909,875 A | 6/1999 | Weingardt | |
| 5,935,002 A | 8/1999 | Falciglia | |
| 5,951,396 A | 9/1999 | Tawil | |
| 5,967,895 A | 10/1999 | Kellen | |
| 6,012,984 A | 1/2000 | Roseman | |
| 6,089,980 A | 7/2000 | Gauselmann | |
| 6,099,407 A | 8/2000 | Parker, Jr. et al. | |
| 6,186,892 B1 | 2/2001 | Frank et al. | |
| 6,220,596 B1 | 4/2001 | Horan | |
| 6,306,038 B1 | 10/2001 | Graves et al. | |
| 6,354,941 B2 | 3/2002 | Miller et al. | |
| 6,381,465 B1 | 4/2002 | Chern et al. | |
| 6,398,645 B1 | 6/2002 | Yoseloff | |
| 6,404,925 B1* | 6/2002 | Foote et al. | 382/224 |
| 6,473,609 B1 | 10/2002 | Schwartz et al. | |
| 6,565,091 B2 | 5/2003 | Weingardt | |
| 6,581,935 B1 | 6/2003 | Odom | |
| 6,585,590 B2 | 7/2003 | Malone | |
| 6,599,188 B2 | 7/2003 | Hirsch et al. | |
| 6,609,973 B1 | 8/2003 | Weiss | |
| 6,645,072 B1 | 11/2003 | Kellen | |
| 6,764,398 B2 | 7/2004 | Stone et al. | |
| 6,774,917 B1* | 8/2004 | Foote et al. | 715/700 |
| 6,931,159 B2 | 8/2005 | Ridge | |
| 6,957,220 B2 | 10/2005 | Lamkin et al. | |
| 7,016,539 B1 | 3/2006 | Silver et al. | |
| 7,236,652 B2* | 6/2007 | Kasutani | 382/305 |
| 7,376,274 B2* | 5/2008 | Xiong | 382/218 |
| 7,489,804 B2* | 2/2009 | Kontsevich | 382/103 |
| 7,751,805 B2* | 7/2010 | Neven et al. | 455/414.3 |
| 7,760,956 B2* | 7/2010 | Lin et al. | 382/254 |
| 2001/0048195 A1 | 12/2001 | Horan | |
| 2002/0009286 A1* | 1/2002 | Kasutani | 386/46 |
| 2002/0013940 A1 | 1/2002 | Tsukamoto et al. | |
| 2002/0069218 A1* | 6/2002 | Sull et al. | 707/501.1 |
| 2002/0113369 A1 | 8/2002 | Weingardt | |
| 2002/0117803 A1 | 8/2002 | Weingardt | |
| 2002/0177454 A1 | 11/2002 | Karri et al. | |
| 2003/0021481 A1* | 1/2003 | Kasutani | 382/218 |
| 2003/0040354 A1 | 2/2003 | Itkis et al. | |
| 2003/0105739 A1 | 6/2003 | Essafi et al. | |
| 2004/0133927 A1* | 7/2004 | Sternberg et al. | 725/136 |
| 2004/0178579 A1 | 9/2004 | Lowell et al. | |
| 2004/0185931 A1 | 9/2004 | Lowell et al. | |
| 2004/0215500 A1 | 10/2004 | Monaham | |
| 2004/0248558 A1 | 12/2004 | Chandhok | |
| 2004/0249905 A1 | 12/2004 | Wilcock et al. | |
| 2004/0252238 A1 | 12/2004 | Park et al. | |
| 2004/0258397 A1* | 12/2004 | Kim | 386/94 |
| 2005/0021394 A1 | 1/2005 | Miedema et al. | |
| 2005/0117783 A1 | 6/2005 | Sung et al. | |
| 2005/0125821 A1* | 6/2005 | Li et al. | 725/19 |
| 2005/0147303 A1 | 7/2005 | Zhou et al. | |
| 2005/0165640 A1 | 7/2005 | Kotorov | |
| 2005/0192088 A1 | 9/2005 | Hartmann et al. | |
| 2005/0227752 A1 | 10/2005 | Weiss | |
| 2005/0271304 A1* | 12/2005 | Retterath et al. | 382/305 |
| 2006/0031175 A1 | 2/2006 | Sellars et al. | |
| 2006/0075237 A1 | 4/2006 | Seo et al. | |
| 2006/0095852 A1* | 5/2006 | Trepess et al. | 715/741 |
| 2006/0121977 A1 | 6/2006 | Odom | |
| 2006/0141923 A1 | 6/2006 | Goss | |
| 2006/0189388 A1 | 8/2006 | Hartman et al. | |
| 2006/0253702 A1 | 11/2006 | Lowell et al. | |
| 2007/0033170 A1* | 2/2007 | Sull et al. | 707/3 |
| 2007/0038612 A1* | 2/2007 | Sull et al. | 707/3 |
| 2009/0019149 A1 | 1/2009 | Cohen et al. | |

FOREIGN PATENT DOCUMENTS

| | | |
|---|---|---|
| WO | WO-02085046 | 10/2002 |
| WO | WO-02097665 | 12/2002 |
| WO | WO-2007/015228 | 2/2007 |

OTHER PUBLICATIONS

Gersho and Gray, "Vector Quantization and Signal Compression", Kluwer Academic Press, 1992, front page and content.
3GPP Technical Specification (TS) 23.140. "Multimedia Messaging Service Functional Description".
3GPP Ts 26.140. "Multimedia Messaging Service; Media Formats and Codec".
U.S. Appl. No. 11/994,544 Official Action dated Jun. 23, 2011.
International Application PCT/IL2006/000182 Search Report dated Oct. 18, 2006.
U.S. Appl. # 11/994,544 Official Action dated Nov. 16, 2011.

* cited by examiner

MATCHING OF MODIFIED VISUAL AND AUDIO MEDIA

CROSS REFERENCE TO PRIOR APPLICATIONS

This application is the U.S. national phase of International Application No. PCT/IL2007/000138, filed Feb. 4, 2007, which claims priority from U.S. Provisional Application No. 60/771,536, filed Feb. 7, 2006. Both applications are incorporated herein by reference in their entirety. The International Application was filed in English on Aug. 16, 2007 as WO 2007/091243 under PCT Article 21(2).

FIELD OF THE INVENTION

The present invention relates generally to multimedia digital content and specifically to methods and systems for identifying and matching different items of multimedia content.

BACKGROUND OF THE INVENTION

Multimedia-enabled cellular phone systems enable users of phones and other terminals to receive multimedia content, including objects such as pictures, music, video, and executable programs. Multimedia Messaging Service (MMS) enables phone users to send and to receive multimedia messages that encapsulate multimedia content. Users may also download multimedia content to their phones from a content download platform (CDP). Operators of cellular phone systems may generate revenue by charging users for the receipt and/or transmission of multimedia content. Operators may also compensate or share revenue with content providers or users who contribute content. When content is forwarded many times between users, the propagation may be referred to as "viral distribution."

For example, U.S. Patent Application Publication 2005/0021394, whose disclosure is incorporated herein by reference, describes a method and system for distributing a multimedia object. A server receives a request to buy the multimedia object from a client device. After authorizing the request, an identifier for the object is forwarded to a file sharing network. A node that is able to distribute the object to the client signals a positive response to the server and subsequently transmits the object to the client. The operator of the node is then rewarded for distributing the object in this fashion.

In one embodiment, the request is forwarded by obtaining a "fingerprint" for the multimedia object and submitting a query comprising the fingerprint to a node in the file sharing network. A fingerprint of this sort is a representation of the most relevant perceptual features of the object in question. The fingerprints of a large number of multimedia objects along with their associated respective metadata, such as the title, artist, genre and so on, are stored in a database. The metadata of a multimedia object are retrieved by computing its fingerprint and performing a lookup or query in the database using the computed fingerprint as a lookup key or query parameter. The lookup then returns the metadata associated with the fingerprint.

U.S. Patent Application Publication 2006/0075237, whose disclosure is incorporated herein by reference, describes a method and arrangement for extracting a fingerprint from a multimedia signal, particularly an audio signal, which is invariant to speed changes of the audio signal. The method comprises extracting a set of robust perceptual features from the multimedia signal, for example, the power spectrum of the audio signal. A Fourier-Mellin transform converts the power spectrum into Fourier coefficients that undergo a phase change if the audio playback speed changes. Their magnitudes or phase differences constitute a speed change-invariant fingerprint. By a thresholding operation, the fingerprint can be represented by a compact number of bits.

Various methods have also been proposed for detecting replicated images notwithstanding changes such as image format conversion, resampling, and transformations such as translation, scaling and rotation. Some approaches use feature vectors, as described, for example, by Chang et al., in "RIME: A Replicated Image Detector for the World-Wide Web," *Proceedings of SPIE Symposium on Voice, Video and Data Communications* (Boston, Mass., November, 1998), pages 58-67, which is incorporated herein by reference. RIME characterizes each image using a Discrete Wavelet Transform (DWT) for each of the three color components. Since each image is thus represented by a multi-dimensional feature vector, searching for replicas of an image is performed by searching for vectors in the neighborhood of the given vector.

SUMMARY OF THE INVENTION

Embodiments of the present invention that are described hereinbelow provide methods and systems for matching items of audio and visual electronic content. Such items are referred to hereinbelow as audio media objects and visual media objects. Typically, each such object is represented compactly by a digital data structure, which is referred to as a feature vector. (In the audio applications that are described hereinbelow, the feature vector may take the form of a binary "fingerprint.")

Upon receiving an object to be matched, the feature vector of the item is computed and is then compared to a repository of such representations of objects that have been previously analyzed. The system is able, in this manner, to identify both exact duplicates and near-duplicates of the objects in the repository, at high speed and low computational cost. The techniques described hereinbelow may be applied, for example, in content retrieval, detection of unauthorized copying and forbidden materials, and tracking content use and distribution, particularly in the context of content transmission over communication networks.

There is therefore provided, in accordance with an embodiment of the present invention, a method for matching media objects, including:

receiving a plurality of reference objects, each reference object including a respective first sequence of reference image frames;

computing respective reference feature vectors of one or more of the reference image frames in each of the reference objects;

receiving a query object, including a second sequence of query image frames;

computing a respective query feature vector of at least one of the query image frames;

searching the reference feature vectors to find one or more candidate objects among the reference objects, such that a respective reference feature vector of one of the reference image frames in each of the one or more candidate objects matches the query feature vector;

comparing at least one additional reference image frame, which follows the one of the reference image frames in each of the one or more candidate objects, to at least one additional query image frame, which follows the at least one of the query image frames in the query object, in order to determine that one of the candidate objects is a match for the query object; and outputting a record of the match.

In some embodiments, computing the respective reference and query feature vectors includes dividing at least one of the reference image frames and the at least one of the query image frames into a predetermined set of blocks, and computing a feature, such as an average color value, of each of the blocks.

In a disclosed embodiment, receiving the query object includes extracting the query object from a transmission over a communication network. Typically, the communication network includes a telephone network, and the transmission includes a multimedia message transmitted over the telephone network. In some cases, the query object includes an instance of one of the reference objects that has been modified in the transmission over the communication network, and searching the reference feature vectors includes compensating for modification of the query object so as to identify the one of the reference objects from which the query object is derived. Outputting the record may include generating a billing record so as to effect a transfer of payment responsively to the transmission.

In one embodiment, computing the respective query feature vector includes identifying one or more constant-color frames from a beginning of the second sequence, and computing the respective query feature vector of at least one of the query image frames following the constant-color frames.

Additionally or alternatively, computing the respective query feature vector includes identifying a lead-in at a beginning of the second sequence, wherein the lead-in is common to a plurality of the reference objects, and computing the respective query feature vector of at least one of the query image frames following the lead-in. Typically, computing the respective reference feature vectors includes, for each of the plurality of the reference objects, determining a first feature vector of a first reference image frame in the lead-in, and calculating at least one second feature vector of a second reference image frame following the lead-in, and searching the reference feature vectors includes matching the respective query feature vector to the at least one second feature vector.

In some embodiments, searching the reference feature vectors includes adjusting at least one of the reference and query feature vectors to compensate for a change in aspect ratio of the query image frames relative to the reference image frames of one of the reference objects from which the query object is derived. Additionally or alternatively, computing the respective reference feature vectors and query feature vector may include computing multiple feature vectors of at least one frame from among the reference image frames and the query image frames, each of the multiple feature vectors corresponding to a different base characteristic of the query image frames relative to the reference image frames. Further additionally or alternatively, the query image frames may include borders as a result of the change in the aspect ratio, and searching the reference feature vectors includes removing the borders in order to find the one or more candidate objects.

Further additionally or alternatively, searching the reference feature vectors includes identifying the change in the aspect ratio that has been applied to the query image frames, and comparing the at least one additional reference image includes applying the identified change in comparing the at least one additional reference image frame to the at least one additional query image frame in order to determine that the one of the candidate objects is the match for the query object.

In a disclosed embodiment, the feature vectors include multiple vector elements having respective values, and computing the respective reference feature vectors includes quantizing the respective values of the vector elements and building a search tree including multiple tiers of arrays corresponding respectively to the vector elements of the feature vectors, each array including pointers to the arrays in a subsequent tier of the search tree, wherein the pointers are indexed by the respective quantized values of the vector elements, wherein searching the reference feature vectors includes traversing the search tree using the quantized values of the vector elements of the query feature vector as indices.

In one embodiment, searching the reference feature vectors includes finding a match between the respective reference feature vector of a first reference image frame and the respective query feature vector of a first query image frame, and comparing the at least one additional reference image frame includes computing and comparing respective query feature vectors of one or more of the query image frames following the first query image frame to the respective reference feature vectors of the one or more of the reference image frames following the first reference image frame.

Additionally or alternatively, comparing the at least one additional reference image frame may comprise aligning the first and second sequences, and comparing the aligned sequences. In one embodiment, aligning the first and second sequences includes associating each of a plurality of the query image frames with a respective one of the reference image frames, while at least one of the reference image frames in the first sequence has no query image frame associated therewith due to dropping of one or more of the query image frames from the first sequence of the reference image frames of one of the reference objects from which the query object is derived. Associating each of the plurality of the query image frames with the respective one of the reference image frames may include applying dynamic time warping to at least one of the first and second sequences.

Further additionally or alternatively, aligning the first and second sequences includes associating a first reference image frame and a first query image frame, and comparing a second query image frame, immediately following the first query image frame in the second sequence, with both a second reference frame, immediately following the first reference image frame in the first sequence, and a third reference frame, immediately following the second reference image frame in the first sequence, in order to associate the second query image frame with one of the second and third reference frames.

There is also provided, in accordance with an embodiment of the present invention, a method for matching vectors, including: receiving a plurality of reference vectors, each reference vector including multiple reference vector elements having respective values;

building a search tree including multiple tiers of arrays corresponding respectively to the vector elements of the reference vectors, each array including pointers to the arrays in a subsequent tier of the search tree, wherein the pointers are indexed by the respective values of the vector elements, and the pointers in a final tier of the search tree point to leaves corresponding to the reference vectors;

receiving a query vector, including query vector elements corresponding respectively to the reference vector elements;

specifying a radius of tolerance; and traversing the search tree using search values that are within the radius of tolerance of the values of the vector elements of the query feature vector as indices in order to find the leaves corresponding to one or more of the reference vectors that match the query vector.

In one embodiment, specifying the radius of tolerance includes applying different radii at different tiers of the search tree, responsively to a predefined distribution of the radii.

There is additionally provided, in accordance with an embodiment of the present invention, a method for matching media objects, including:

receiving a plurality of reference objects, including respective reference audio segments;

computing respective reference feature vectors of the reference audio segments that are indicative of first spectral distributions of energy in the reference audio segment over a first sequence of time-domain windows, each including no more than 512 audio samples, by applying a frequency transform to each of the time-domain windows;

receiving a query object, including a query audio segment;

computing a query feature vector that is indicative of a second spectral distribution of the energy in the query audio segment by applying the frequency transform to a second sequence of the time-domain windows;

searching the reference feature vectors to find one of the reference objects having a respective reference feature vector that matches the query feature vector; and outputting a record indicating that the one of the reference objects matched the query object.

Typically, each of the time-domain windows includes 128 samples, and the time-domain windows in each of the sequences are mutually overlapping, with a separation of 64 samples between successive windows.

In one embodiment, computing the spectral distributions includes computing a respective moving average of the energy in each of a plurality of frequency bands over successive sequences of the windows.

Optionally, computing the respective reference feature vectors includes computing respective masks that are indicative of respective magnitudes of at least one characteristic of the time-domain windows, and searching the reference feature vectors includes selecting the time-domain windows in which to compare the reference and query feature vectors responsively to the masks.

There is further provided, in accordance with an embodiment of the present invention, a method for matching media objects, including:

receiving a plurality of reference objects, including respective reference audio segments, which include respective successions of time-domain samples;

computing respective reference feature vectors of the reference audio segments by averaging the time-domain samples in the reference audio segments over each of a first sequence of time-domain windows, so as to compute a total energy content in each of the time-domain windows, and computing a time derivative of the energy between successive ones of the time-domain windows in the first sequence;

receiving a query object, including a query audio segment;

computing a query feature vector by averaging the time-domain samples in the query audio segment over each of a second sequence of time-domain windows, and computing the time derivative of the energy between successive ones of the time-domain windows in the second sequence;

searching the reference feature vectors to find one of the reference objects having a respective reference feature vector that matches the query feature vector by comparing respective signs of the time derivatives in the reference and query feature vectors; and outputting a record indicating that the one of the reference objects matched the query object.

In one embodiment, computing the respective reference feature vectors includes computing respective masks that are indicative of respective magnitudes of at least one characteristic of the time-domain windows, the at least one characteristic including one or more of the energy and the derivatives, and searching the reference feature vectors includes selecting the time-domain windows in which to compare the respective signs responsively to the masks.

There is moreover provided, in accordance with an embodiment of the present invention, apparatus for matching media objects, including:

a memory, which is arranged to store a plurality of reference objects, each reference object including a respective first sequence of reference image frames; and a content tracker, which is configured to compute respective reference feature vectors of one or more of the reference image frames in each of the reference objects, and upon receiving a query object including a second sequence of query image frames, to compute a respective query feature vector of at least one of the query image frames, and to search the reference feature vectors to find one or more candidate objects among the reference objects, such that a respective reference feature vector of one of the reference image frames in each of the one or more candidate objects matches the query feature vector, and to compare at least one additional reference image frame, which follows the one of the reference image frames in each of the one or more candidate objects, to at least one additional query image frame, which follows the at least one of the query image frames in the query object in order to determine that one of the candidate objects is a match for the query object, and to output a record of the match.

There is furthermore provided, in accordance with an embodiment of the present invention, apparatus for matching vectors, including:

a memory, which is arranged to store a plurality of reference vectors, each reference vector including multiple reference vector elements having respective values; and a processor, which is configured to build a search tree including multiple tiers of arrays corresponding respectively to the vector elements of the reference vectors, each array including pointers to the arrays in a subsequent tier of the search tree, wherein the pointers are indexed by the respective values of the vector elements, and the pointers in a final tier of the search tree point to leaves corresponding to the reference vectors, and upon receiving a query vector including query vector elements corresponding respectively to the reference vector elements, to traverse the search tree using search values that are within a specified radius of tolerance of the values of the vector elements of the query feature vector as indices in order to find the leaves corresponding to one or more of the reference vectors that match the query vector.

There is also provided, in accordance with an embodiment of the present invention, apparatus for matching media objects, including:

a memory, which is arranged to store a plurality of reference objects, including respective reference audio segments; and a content tracker, which is configured to compute respective reference feature vectors of the reference audio segments that are indicative of first spectral distributions of energy in the reference audio segment over a first sequence of time-domain windows, each including no more than 512 audio samples, by applying a frequency transform to each of the time-domain windows, and upon receiving a query object including a query audio segment, to compute a query feature vector that is indicative of a second spectral distribution of the energy in the query audio segment by applying the frequency transform to a second sequence of the time-domain windows, and to search the reference feature vectors to find one of the reference objects having a respective reference feature vector that matches the query feature vector, and to output a record indicating that the one of the reference objects matched the query object.

There is additionally provided, in accordance with an embodiment of the present invention, apparatus for matching media objects, including:

a memory, which is arranged to store a plurality of reference objects, including respective reference audio segments, which include respective successions of time-domain samples; and a content tracker, which is configured to compute respective reference feature vectors of the reference audio segments by averaging the time-domain samples in the reference audio segments over each of a first sequence of time-domain windows, so as to determine a total energy content in each of the time-domain windows, and calculating a time derivative of the energy between successive ones of the time-domain windows in the first sequence, and upon receiving a query object including a query audio segment, to compute a query feature vector by averaging the time-domain samples in the query audio segment over each of a second sequence of time-domain windows, and calculating the time derivative of the energy between successive ones of the time-domain windows in the second sequence, and to search the reference feature vectors to find one of the reference objects having a respective reference feature vector that matches the query feature vector by comparing respective signs of the time derivatives in the reference and query feature vectors, and to output a record indicating that the one of the reference objects matched the query object.

There is further provided, in accordance with an embodiment of the present invention, a computer software product, including a computer-readable medium in which program instructions are stored, which instructions, when read by a computer, cause the computer to store a plurality of reference objects, each reference object including a respective first sequence of reference image frames, to compute respective reference feature vectors of one or more of the reference image frames in each of the reference objects, and upon receiving a query object including a second sequence of query image frames, to compute a respective query feature vector of at least one of the query image frames, and to search the reference feature vectors to find one or more candidate objects among the reference objects, such that a respective reference feature vector of one of the reference image frames in each of the one or more candidate objects matches the query feature vector, and to compare at least one additional reference image frame, which follows the one of the reference image frames in each of the one or more candidate objects, to at least one additional query image frame, which follows the at least one of the query image frames in the query object in order to determine that one of the candidate objects is a match for the query object, and to output a record of the match.

There is moreover provided, in accordance with an embodiment of the present invention, a computer software product, including a computer-readable medium in which program instructions are stored, which instructions, when read by a computer, cause the computer to store a plurality of reference vectors, each reference vector including multiple reference vector elements having respective values, and to build a search tree including multiple tiers of arrays corresponding respectively to the vector elements of the reference vectors, each array including pointers to the arrays in a subsequent tier of the search tree, wherein the pointers are indexed by the respective values of the vector elements, and the pointers in a final tier of the search tree point to leaves corresponding to the reference vectors, and upon receiving a query vector including query vector elements corresponding respectively to the reference vector elements, to traverse the search tree using search values that are within a specified radius of tolerance of the values of the vector elements of the query feature vector as indices in order to find the leaves corresponding to one or more of the reference vectors that match the query vector.

There is furthermore provided, in accordance with an embodiment of the present invention, a computer software product, including a computer-readable medium in which program instructions are stored, which instructions, when read by a computer, cause the computer to store a plurality of reference objects, including respective reference audio segments, and to compute respective reference feature vectors of the reference audio segments that are indicative of first spectral distributions of energy in the reference audio segment over a first sequence of time-domain windows, each including no more than 512 audio samples, by applying a frequency transform to each of the time-domain windows, and upon receiving a query object including a query audio segment, to compute a query feature vector that is indicative of a second spectral distribution of the energy in the query audio segment by applying the frequency transform to a second sequence of the time-domain windows, and to search the reference feature vectors to find one of the reference objects having a respective reference feature vector that matches the query feature vector, and to output a record indicating that the one of the reference objects matched the query object.

There is also provided, in accordance with an embodiment of the present invention, a computer software product, including a computer-readable medium in which program instructions are stored, which instructions, when read by a computer, cause the computer to store a plurality of reference objects, including respective reference audio segments, and to compute respective reference feature vectors of the reference audio segments by averaging the time-domain samples in the reference audio segments over each of a first sequence of time-domain windows, so as to determine a total energy content in each of the time-domain windows, and calculating a time derivative of the energy between successive ones of the time-domain windows in the first sequence, and upon receiving a query object including a query audio segment, to compute a query feature vector by averaging the time-domain samples in the query audio segment over each of a second sequence of time-domain windows, and calculating the time derivative of the energy between successive ones of the time-domain windows in the second sequence, and to search the reference feature vectors to find one of the reference objects having a respective reference feature vector that matches the query feature vector by comparing respective signs of the time derivatives in the reference and query feature vectors, and to output a record indicating that the one of the reference objects matched the query object.

The present invention will be more fully understood from the following detailed description of the embodiments thereof, taken together with the drawings in which:

DETAILED DESCRIPTION OF EMBODIMENTS

System Overview

Figure 1:
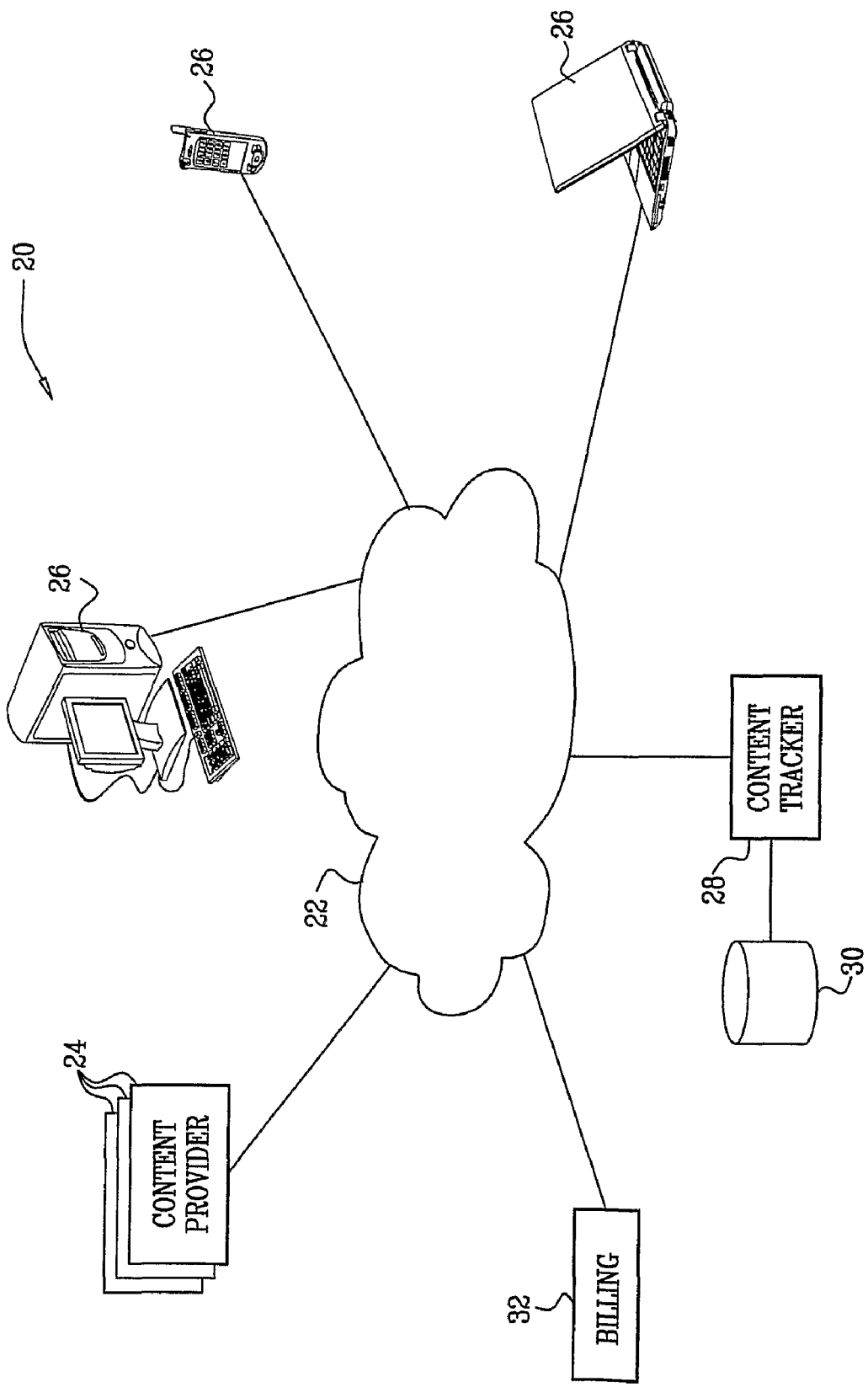
FIG. 1 is a block diagram that schematically illustrates a system for content distribution and tracking, in accordance with an embodiment of the present invention.

FIG. 1 is a block diagram that schematically illustrates a system 20 for distributing and tracking multimedia content, in accordance with an embodiment of the present invention. In this embodiment, content, comprising visual and/or audio media objects, is distributed by one or more content providers 24 over a network 22 to user equipment 26 of multiple users. Network 22 may comprise a telephone network, such as a cellular network, or a packet-switched network, such as the Internet. Although content providers 24 and user equipment 26 are shown and described here, for the sake of conceptual clarity, as separate entities, in practice at least some of the users may also be content providers, using the same equipment 26 for both providing and receiving content.

When one of content providers 24 introduces an original media object into system 20, the object is provisioned in a repository 30, which is associated with a content tracker 28. Provisioning includes associating with the original object a unique identifier and generating and storing a compact digital representation, such as a feature vector, of the object. Feature vectors of two or more levels of granularity may be created so as to facilitate rapid searches through the repository. Content tracker 28 typically comprises a general-purpose computer or a group of such computers, which are programmed in software to carry out the functions that are described hereinbelow. This software may be downloaded to the content tracker in electronic form, over a network, for example, or it may alternatively be provided on tangible media, such as optical, magnetic or electronic memory. Further alternatively or additionally, the content tracker may comprise dedicated digital logic circuits. Repository 30 typically comprises a memory with suitable interface circuits, as are known in the art.

After the original object has been provisioned, content tracker 28 tracks distribution of the object by monitoring one or more channels of digital traffic on network 22. For this purpose, the content tracker typically extracts from the traffic multimedia objects (also referred to herein as content items), and analyzes the extracted objects to determine whether they are instances of any of the tracked objects in repository 30. An extracted object is considered an "instance" of a tracked object even if it is not identical to the tracked object, as long as it matches the tracked object to within a predetermined matching criterion. Specific methods for matching both visual and audio media objects are described in detail hereinbelow.

An instance may differ from the original object due to modifications that may be made in transmitting the object through the network. Such changes may include format changes, such as a change in image format from GIF or BMP to JPEG or a change in video format from MPEG2 to MPEG4 or H.264. Changes may also include changes in resolution, cropping and changes in aspect ratio. Images may undergo intensity changes, and audio clips may undergo volume changes. Images may also be rotated or mirrored. Content quality may be reduced through the reduction of color palette size, through reduction of JPEG or MPEG quality, or through conversion to gray-scale or to black and white. Video quality, in particular, may also be reduced by dropping frames. In addition, black frames and/or common promotional sequences may be present at the beginning of a video sequence. Object analysis performed by content tracker 28 includes generating feature vectors of extracted objects and searching the repository to find provisioned objects with similar feature vectors, while taking into account the possible sorts of modifications that are mentioned above.

When an instance of a provisioned object is identified, content tracker 28 typically makes a record of the event, indicating that the tracked object has been transmitted through the network. The record may be stored by the content tracker in an internal memory, or it may transmitted through an output interface to another computer or to a user interface device. This record may be used in various ways. For example, the content tracker may pass the record to a billing server 32, which may charge a customer for the use of the object or, alternatively or additionally, may reward the appropriate content provider and/or the user who transmitted the content. Uses of these event records, as well as systems and methods for content distribution and tracking that may be used in conjunction with embodiments of the present invention, are described in PCT Patent Application PCT/IL2006/000182, which is assigned to the assignee of the present patent application and whose disclosure is incorporated herein by reference.

On the other hand, although certain methods of content matching are described hereinbelow in the context of system 20, the principles of the present invention are applicable not only in network content tracking, but also in other applications of content matching for purposes of search, sorting, storage and other types of processing of digital media, as are known in the art. For instance, these methods may be adapted for retrieval of content similar to given examples, for music identification (to provide missing metadata, such as song name and performer), and for blocking forbidden multimedia material.

Figure 2:
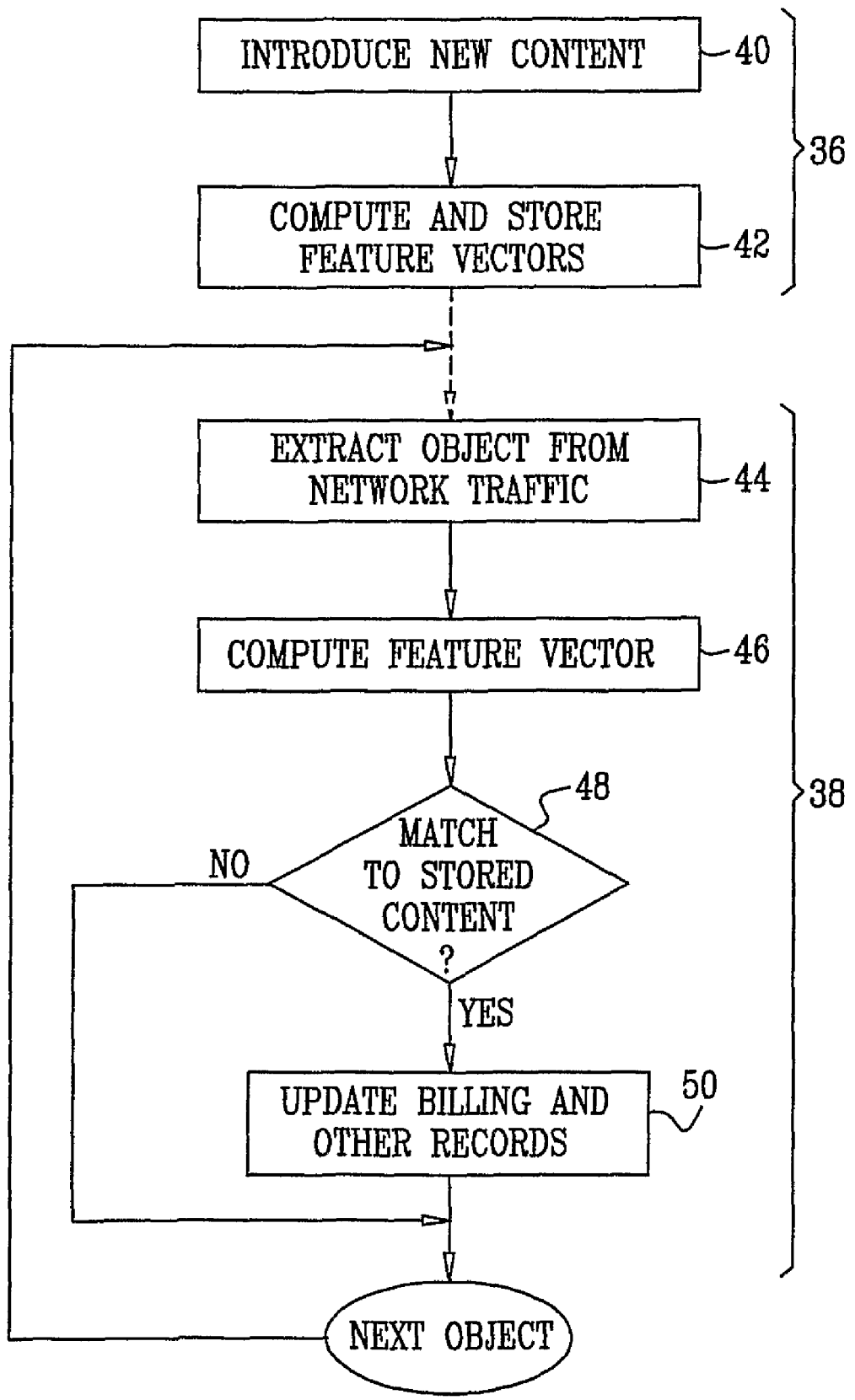
FIG. 2 is a flow chart that schematically illustrates a method for provisioning and matching media objects that are transmitted over a network, in accordance with an embodiment of the present invention.

FIG. 2 is a flow chart that schematically illustrates a method for provisioning and tracking of media objects, in accordance with an embodiment of the present invention. As explained above, the method comprises a provisioning stage 36 and a tracking stage 38. The two stages are shown as occurring sequentially, as indeed they do with respect to any single item of content. In practice, however, both stages may occur concurrently and independently of one another, with new items of content being provisioned in stage 36 while items that were previously provisioned are tracked in stage 38.

Provisioning stage 36 is initiated when one of content providers 24 introduces a new media object, at a content introduction step 40. The content provider notifies content tracker 28, which then provisions the object in repository 30. As part of the provisioning process, the content tracker computes and stores one or more feature vectors representing the object in repository 30, at a vector storage step 42. Specific types of feature vectors and methods for their computation are described below. For a visual media sequence, such as a video clip or animation, feature vectors may be computed not only for the initial frame, but also for a number of subsequent frames. Methods for dealing with image sequences that share a common initial segment of frames such as constant-color or promotional sequences are described further hereinbelow. For audio media, the feature vectors may have the form of a digital "fingerprint," as is also described below.

Tracking stage 38 is initiated each time tracker 28 extracts a media object from the traffic on network 22, at an object extraction step 44. The tracker computes the feature vector of the object, at a vector computation step 46. The method of vector computation used at step 46 is similar to that used at step 42, but may include additional steps to compensate for changes that may have occurred in the item during transmission, as mentioned above. These additional steps are described in the sections that follow.

Tracker 28 compares the feature vector that it has computed to the feature vectors of the comparable objects in repository 30, at a comparison step 48. If a match is found at the coarse level of feature vectors between the current object and one or more candidate objects in the repository, the tracker may perform additional fine matching steps to select the best match among the candidates (if there is more than one candidate) and to verify that the current object does indeed match the selected candidate. Mechanisms for coarse and fine matching are also described in detail hereinbelow. If the current object is found to match one of the objects stored in the repository, tracker 28 records the event, and may also inform billing server 32 and/or take other appropriate actions, at a match recording step 50. The tracker then returns to step 44 to continue to the tracking stage with the next object.

Matching of Visual Media

Figure 3:
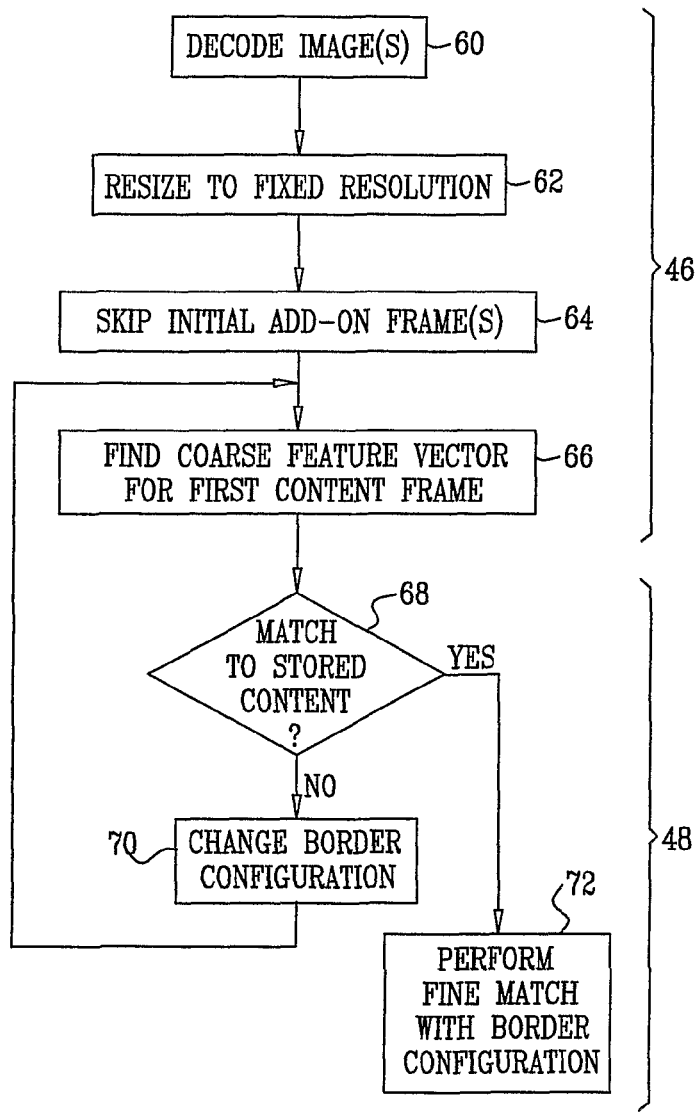
FIG. 3 is a flow chart that schematically illustrates a method for matching visual media objects, in accordance with an embodiment of the present invention.

FIG. 3 is a flow chart that schematically illustrates a method for matching visual media objects, in accordance with an embodiment of the present invention. Such objects may include both still images and image sequences, such as video clips and animation sequences. The method of FIG. 3 corresponds roughly to steps 46 and 48 in FIG. 2. The method is described hereinbelow with reference to image sequences, but it may be applied in a straightforward manner to individual still images, as will be apparent to those skilled in the art.

Step 46, as explained above, is directed to computing a feature vector that characterizes a visual media object. The method of computation that is described hereinbelow is applied not only to objects that are extracted from network traffic at step 44, but also in provisioning of new objects at step 42. To compute the feature vector, the file corresponding to the formatted visual media object is decoded to produce a color raw data representation, at an image decoding step 60. In this representation, each image is typically represented as an array of red, green and blue (RGB) intensity values for each pixel. Alternatively, other color spaces (such as YUV) or monochrome image representations may be used.

The image is resized to a fixed, predetermined resolution, at a resizing step 62. For example, all images processed by content tracker 28 may be resized to 64×64 pixels by appropriate decimation, averaging and/or resampling of pixel values. Alternatively, the images may be resized to a higher resolution (such as (N+2)×(N+2) or (N+4)×(N+4)), and then the borders may be cropped in order to reduce artifacts that may occur at the image borders of the resulting N×N image. Further alternatively, resizing step 62 may be omitted in order to avoid the computational burden of resizing, and subsequent computations may be performed over the entire image, while adjusting for the different number of pixels in the images of the extracted object compared to the images in the provisioned objects.

When image sequences, such as video clips, are transmitted over public networks, they may frequently begin with a number of constant-color frames (typically black) and/or with a short promotional clip, which may be common to a number of different video clips. The method of coarse matching that is described below attempts to match the feature vector of the first frame in the actual content of the extracted video object to that of the first frame in the provisioned version. In case the image sequence includes initial constant-color frames, before performing the coarse matching, content tracker 28 skips over any initial constant-color frames, at a add-on removal step 64. The content tracker identifies and skips over the constant-color frames at step 64 simply by detecting the absence of variations within these frames. (Feature vectors may be computed and saved at step 42 for several frames following the constant-color frames in provisioned video objects, to enable matching by the feature vector of the first frame following the constant-color frames in the extracted object even in the presence of frame dropping.) Methods for dealing with a promotional lead-in clip are described further hereinbelow.

Content tracker 28 then computes a coarse feature vector for the first content frame in the sequence (following any skipped constant-color frames), at a vector computation step 66. For example, the coarse feature vector may be found by choosing sixteen blocks of 16×16 pixels each in the 64×64 image, and then computing the mean color values of each block. Alternatively, blocks of different sizes and/or shapes may be used, including blocks of different sizes within the same image, in order to emphasize certain areas of the image. The set of blocks may cover the entire image precisely or, alternatively, blocks may overlap one another, or there may be gaps left between the blocks. The feature vectors computed at step 66 are referred to as "coarse" solely for the sake of clarity, to distinguish this step from a subsequent "fine matching" step that is described hereinbelow, and the techniques of feature vector computation and matching that are described here may be used at finer or coarser granularity, as dictated by application requirements, without limitation.

In the example mentioned above, the feature vector in this case has forty-eight elements, corresponding to the R, G and B color values for each of the sixteen blocks. Formally, the elements of the feature vector $v(j)$ may be written as follows:

$$v(16i_c + 4i_y + i_x) = \sum_{j=0}^{15} \sum_{k=0}^{15} \text{norm\_image}(16i_x + j, 16i_y + k, i_c) \quad (1)$$

wherein norm_image is the reduced, fixed-size image; $i_x$ and $i_y$ are horizontal and vertical block indices, with $i_x=0\ldots3$ and $i_y=0\ldots3$; and $i_c$ is the color plane index (R,G,B), $i_c=0\ldots2$. (The sums in the equation may be normalized by a constant to give the actual mean values, or the sums may be used without normalization.)

Alternatively, other feature vector formulations may be used, as will be apparent to those skilled in the art. For example, the feature vector may contain monochrome intensity information, instead of or in addition to the mean color values, as well as color information in other color space representations, such as YUV. As another example, the feature vector may include additional features, such as the standard deviation of the pixel values within each block, the mean color over the whole image, and higher-order statistical features.

As noted above, at step 42 in provisioning stage 36 (FIG. 2), coarse feature vectors of this sort may be computed for multiple frames at the beginning of the provisioned image sequence. If the sequence as provisioned includes a promotional lead-in, feature vectors may be computed both for the first frame(s) of the lead-in and certain frames at the beginning of the actual image sequence, as described hereinbelow. (This solution may also be applied to video objects that begin with a lead-in of constant-color frames.)

Content tracker 28 attempts to match the feature vector of the extracted object to the feature vectors that are provisioned in repository 30, at a vector matching step 68. An approximate or fuzzy matching technique may be used at this step to allow for changes that may have occurred in the extracted object in the course of transmission and re-transmission over the network. A set of data structures and a fuzzy search method that may be used advantageously at this step are described below with reference to FIGS. 5 and 6. Alternatively, the content tracker may apply to the feature vectors any other suitable search and matching algorithm that is known in the art. The matching process takes into account the possibility that the extracted object includes a promotional lead-in, as well as the possibility that borders have been added to the image or images in question in order to adjust for differences in aspect ratio. Methods for dealing with these possibilities are described hereinbelow.

Step 68 typically results in a list of one or more candidate objects, among the image sequences provisioned in repository 30. The candidate objects are those whose respective coarse feature vectors matched the feature vector computed at step 66 for the extracted object to within a predefined bound. (When the extracted object is not a modified version of one of the provisioned objects, but is rather some unrelated object, step 68 typically produces an empty (or very short) list of candidates.) Content tracker 28 then performs fine matching between one or more of the frames of the extracted object and corresponding frames of the candidate objects in order to choose the best match (if any), at a fine matching step 72. Details of this step are described hereinbelow.

In some embodiments, the content tracker determines the similarity between feature vectors at step 68 using a distance measure. For example, assume the content tracker is to match two single images I and J, having respective n-dimensional feature vectors $FI=\{fI_1, fI_2, \ldots fI_n\}$ and $FJ=\{fJ_1, fJ_2, \ldots fJ_n\}$.

The distance between the images may be determined using the mean square error (MSE) formulation:

$$D_{mse}(FI, FJ) = \sqrt{\frac{1}{n}\sum_{k=1}^{n}(fI_k - fJ_k)^2} \quad (2)$$

The distance computation may optionally be modified to reduce its sensitivity to outliers, for example, by eliminating from equation (2) all indices k for which $(fI_k-fJ_k)^2$ is larger than a predefined threshold, or by rejecting a small percentage (typically less than 5%) of the indices that give the highest contributions.

Alternatively, the content tracker may determine the similarity between feature vectors using the sum of absolute differences (SAD):

$$D_{sad}(FI, FJ) = \frac{1}{n}\sum_{k=1}^{n}|fI_k - fJ_k| \quad (3)$$

Outliers may also be eliminated from this formula in the manner explained above.

Still another alternative, which is useful in dealing with minor content modifications, is to use a distance one-zero (DOZ) measure, which gives a zero weight to small differences and a constant weight to larger differences:

$$D_{doz} = \frac{1}{n}\sum_{k=1}^{n} d_k \quad (4)$$

wherein $$d_k = \begin{cases} 0 & \text{if } |fI_k - fJ_k| < \text{T\_outlier} \\ 1 & \text{else} \end{cases}$$

and wherein T_outlier is a predetermined threshold. The DOZ distance thus measures the percentage of outlier feature components, namely components that deviate by more than a threshold T_outlier. The DOZ measure behaves differently from the other distance measures described above, since if all the deviations of the corresponding feature vector elements are less than T_outlier, $D_{doz}=0$, while the MSE and SAD measures may still give significant distances.

For multi-frame matching of image sequences, the above distance measures may be extended over multiple frames. For this purpose, it is assumed that the sequences that are to be matched, I and J, have the same number of frames Nf. (A method for sequence alignment that may be used to create this sort of one-to-one frame association is described hereinbelow.) The total distance between the sequences is defined by:

$$Dtotal(FI, FJ) = \frac{1}{Nf}\sum_{i=1}^{Nf} Dframe[FI(i), FJ(i)] \quad (5)$$

wherein FI(i) and FJ(i) denote the respective feature vectors of the ith frame in the two sequences, and Dframe[FI(i),FJ(i)] is the per-frame distance between these feature vectors, using one of the distance measures defined above, for example. The total distance is thus defined as a normalized distance per frame. This sort of multi-frame vector matching may be used in the fine matching stage that is described hereinbelow.

As noted earlier, content tracker 28 typically determines that two objects match (i.e., that the extracted object is a modified version of a provisioned object, or in some applications, that the objects are perceptually similar) if the distance between the feature vectors is less than a predefined threshold. The threshold value is chosen as a compromise between missed detection probability (Pmd) and false detection probability (Pfd). Typically, the threshold is determined empirically using representative objects and common modifications that may occur in such objects.

Since it is difficult to predict how a complex content modification will affect each of the different distance measures defined above, content tracker 28 may use a combined approach. In other words, a respective decision threshold, $T_{mse}$, $T_{sad}$, or $T_{doz}$, may be defined for each distance measure, and the content tracker may make its decision regarding each of the match candidates by comparing each of the distances to the respective threshold. For example, to ensure low Pfd, the separate decision thresholds may be set to low values. On the other hand, to avoid degrading the Pmd too much, the extracted object may be considered to match a provisioned sequence if any of the three partial decisions is less than the respective threshold.

Alternatively, a weighted distance may be defined based on all of the distances and the respective thresholds:

$$D = W_{mse} \cdot F(D_{mse}, T_{mse}) + W_{sad} \cdot F(D_{sad}, T_{sad}) + W_{doz} \cdot F(D_{doz}, T_{doz})$$

$$W_{mse} + W_{sad} + W_{doz} = 1 \quad (6)$$

wherein $F(\cdot)$ is an appropriate normalization function, such as the sigmoid function defined by $F(d, T) = [1 + \exp(-\lambda \cdot (d - T))]^{-1}$. The parameter $\lambda$ in this function controls the transition slope from 0 to 1 and may be different for the different measures. When $d=T$, the function outputs a value 0.5, and therefore the threshold for the soft decision in this case is 0.5.

Handling of Lead-Ins and Borders

Figure 4:
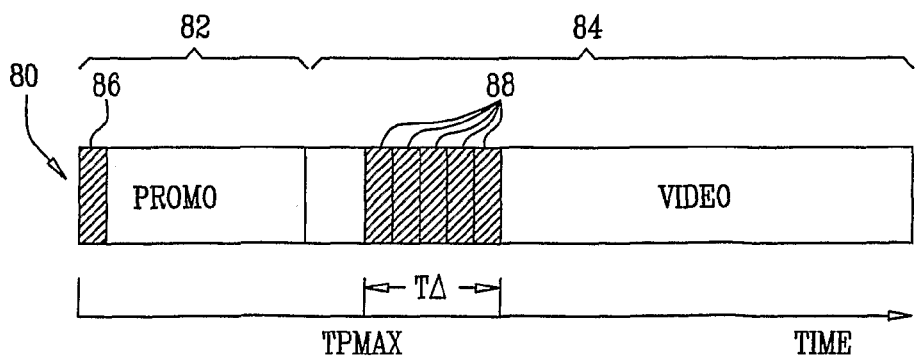
FIG. 4 is a block diagram that schematically illustrates a method for analyzing a video object, in accordance with an embodiment of the present invention.

FIG. 4 is a block diagram that schematically illustrates a method for matching image sequences at step 68 in the presence of promotional lead-ins, in accordance with an embodiment of the present invention. The term "promotional lead-in" refers to any sort of preliminary content that is not part of the actual image sequence content itself (even if the lead-in is included as part of the object at the provisioning stage), such as an initial sequence of frames indicating sponsorship or ownership of the subsequent sequence or an advertisement for goods or services, for example. The method assumes that multiple different image sequences may share the same promotional lead-in, and that the maximum duration of all the existing promotional lead-ins is known. (This duration is referred to hereinbelow as TPmax.) On the other hand, some image sequences may have no promotional lead-in.

As shown in FIG. 4, a provisioned image sequence 80 comprises a promotional lead-in 82 and an actual image sequence 84. Lead-in 82 is shorter (as expected) than TPmax, which is marked on the time axis at the bottom of the figure. At step 42 (FIG. 2), content tracker 28 computes the coarse feature vector of a first frame 86 in sequence 80. The content tracker at this point is not necessarily able to determine whether this first frame belongs to a promotional lead-in or to an actual image sequence that is to be matched. (If the content tracker were to compare only the first frames of the extracted and provisioned image sequences, it would not be able to distinguish between different sequences that share a common lead-in, and would therefore identify all of the provisioned sequences with this lead-in as candidates to match the extracted sequence). Therefore, the content tracker decodes a set of frames 88 in sequence 80 that begin at TPmax and extend over a period TΔ, and computes the feature vector of each of frames 88. TΔ may be set to any suitable value. For example, TΔ may be set to contain at least Rd frames 88, wherein Rd is the maximum frame rate drop ratio. Rd is typically a number in the range 3-10. The content tracker stores the feature vectors of all of frames 86 and 88 in repository 30.

Returning now to step 68 in FIG. 3, in order to determine which provisioned objects in repository 30 are candidates to match the object extracted at step 44, the content tracker performs the following decision steps:

1. The content tracker searches repository 30 in order to generate a candidate list of the provisioned objects that have a feature vector that matches the feature vector of the initial frame in the extracted object. If no matching feature vector is found, the content tracker determines that the extracted object does not match any of the provisioned objects.

2. If the candidate list is short (no more than five candidates, for example), the content tracker assumes that the extracted object does not contain a common promotional lead-in, and therefore proceeds to test all of the candidates for fine matching to the extracted object, as described hereinbelow.

3. If the candidate list is long, the content tracker assumes that the extracted object does contain a common promotional lead-in (meaning that the feature vector of the initial frame in the extracted object matched the feature vector of the initial frame in one or more lead-ins that appear at the beginning of many of the provisioned image sequences in repository 30). In this case, the content tracker advances to time TPmax in the extracted object, decodes and computes the feature vector of the next frame, and attempts to match this feature vector to the feature vectors of the image sequences in repository 30. The matching feature vectors will presumably be associated with at least one of frames 88 in actual video sequences 84. The content tracker thus generates a new (typically shorter) list of candidates for fine matching.

This method may be extended, for example, by taking feature vectors of K·Rd frames at the provisioning stage, and using the feature vectors of K frames after TPmax at the matching stage. This same method (as described above for promotional lead-ins) may be used in matching video sequences that begin with a number of constant-color frames.

In step 3 above, the search over feature vectors of frames 88 is typically limited to the provisioned objects that were in the initial (long) candidate list that was found at step 1. To facilitate this sort of searching, the set of feature vectors of frames 88 belonging to the provisioned objects that begin with a given promotional lead-in may be stored in a search tree (such as the tree that is shown below in FIG. 5) as sub-trees of a leaf that is associated with the feature vector of initial frame 86. Alternatively, the feature vectors of frames 88 may be stored in the same general search tree as those of frames 86.

Returning now to FIG. 3, a further issue that may arise at step 68 is the addition of horizontal and/or vertical borders (typically black borders) at the edges of the image frames. Such borders may be added as a given image sequence is transmitted and re-transmitted at different aspect ratios. Certain base characteristics of the image frames may change as a result. The aspect ratio of the frames may change, for example, due to format conversions among different encoding standards and/or transcoding to different display dimensions. Increasing the aspect ratio (greater width/height) may result in addition of vertical borders, whereas decreasing the aspect ratio may result in addition of horizontal borders.

Multiple, successive conversions may even lead to addition of both horizontal and vertical borders. Additionally or alternatively, other base characteristics of the image frames may change, as well. For example, the image may shift horizontally and/or vertically due to resizing operations.

In order to neutralize the effect of these borders in the matching process, content tracker 28 may compute multiple different feature vectors for an extracted object, corresponding to multiple different aspect ratios of the source image sequence. (Although the source aspect ratio is not known when the object is extracted, it may be assumed that there is a limited number of different aspect ratios that will be encountered in system 20, based on common imaging standards and codecs.) Typically, the content tracker begins by assuming the source aspect ratio to be the same as the aspect ratio of the extracted object, and therefore computes the feature vector at step 66 over the entire first frame of the object. The content tracker attempts to match this feature vector to the feature vectors of the image sequences in repository 30 at step 68, as explained above.

If no match is found at step 68, the content tracker chooses an alternative source aspect ratio, and thus assumes that the extracted object has horizontal or vertical borders due to the mismatch between the source and object aspect ratios, at a border change step 70. The content tracker computes a new feature vector for the first frame of the extracted object at step 66, in which the presumed borders are omitted from the computation. Due to the change of aspect ratio of the image, the boundaries of the blocks over which the elements of the feature vector are computed may no longer correspond exactly to pixel boundaries. Therefore, it may be necessary to use fractional weights in equation (1) (or a suitably-modified version of this equation if the image is not resized prior to this step) to multiply the values of the pixels along the block edges.

The content tracker repeats the search of repository 30 using the newly-computed feature vector at step 68. If it still fails to find a match, it chooses another, alternative border configuration at step 70, and then repeats the computations described above. The content tracker repeats this cycle over all of the aspect ratios that are assumed to occur in network 22, such as 4/3, 11/9 and 22/15, for example. Optionally, the content tracker may also test "second-generation" aspect ratios, that may result from two successive format conversions. If no match is found at any of the aspect ratios, the content tracker concludes that the extracted object does not correspond to any of the provisioned objects.

On the other hand, if a coarse feature vector match is found at any of the chosen aspect ratios at step 68, content tracker 28 assumes this aspect ratio to be the correct one. On this basis, if it is necessary to repeat the coarse feature vector matching for frames following a promotional lead-in (as described above with reference to FIG. 4), the content tracker removes the presumed borders and adjusts the aspect ratio of these subsequent frames, as well, to the correct ratio. The aspect ratio of the extracted object is likewise adjusted for purposes of precise matching, at fine matching step 72. For individual still images, fine matching is typically performed over all 64×64 pixels of the extracted and candidate provisioned objects in order to find the candidate image that best matches the extracted object (for example, using distance measures given in equations (2), (3) or (4), or some combined decision such as in equation (6)). For image sequences, fine matching may use feature vectors of multiple successive images in the extracted and provisioned sequences (possibly including all of the images in the sequences).

Alternatively, aspect ratio adjustments may be made in computing the feature vectors at step 42 in provisioning stage 36 (FIG. 2). In other words, multiple feature vectors, respectively corresponding to the different aspect ratios that may be used in system 20, are computed for each provisioned object. For each different aspect ratio, appropriate borders are added to the images of the provisioned object for purposes of the feature vector computation. Using this approach, step 70 (FIG. 3) may be eliminated, since the feature vector of the extracted object that is computed initially at step 68 (without aspect ratio adjustment) is compared simultaneously to the feature vectors of each provisioned object for all possible aspect ratios.

It is also possible for the images in the extracted object to have been rotated (typically by multiples of 90°) or mirrored at some stage in transmission. To account for these possibilities, feature vectors of either the extracted object or the provisioned objects may be computed for different rotations and mirroring. It is not actually necessary to recalculate the feature vector elements for this purpose. Rather, it is sufficient to appropriately rearrange the vector elements that were calculated for the non-rotated, non-mirrored images. The content tracker attempts to match both the original feature vector and the rearranged feature vectors at step 68. If a match is found to one of the rearranged feature vectors, the content tracker applies the corresponding rotation and/or mirroring in fine matching step 72.

Search Tree for Matching Feature Vectors

Figure 5:
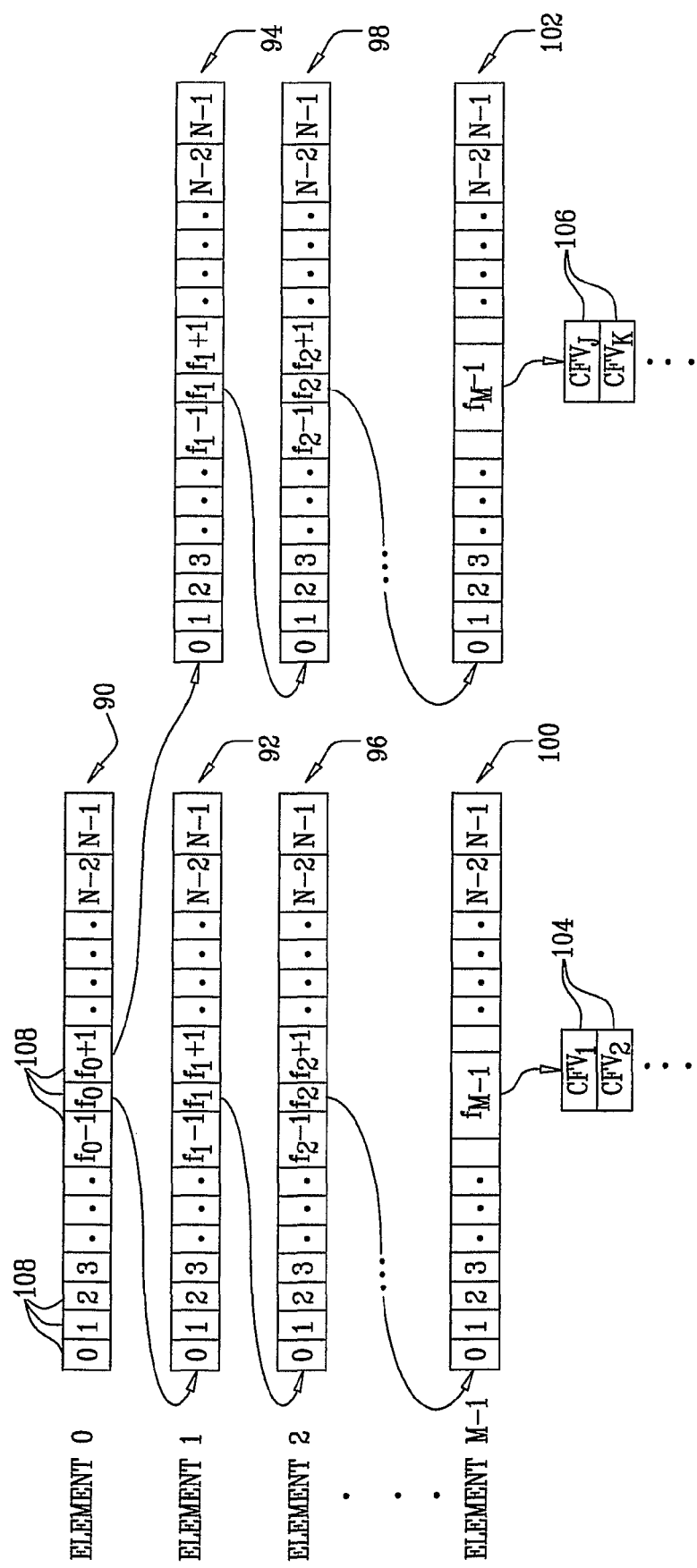
FIG. 5 is a block diagram that schematically illustrates a data structure used to store feature vectors, in accordance with an embodiment of the present invention.

FIG. 5 is a block diagram that schematically illustrates a data structure that may be used to search for matching vectors, in accordance with an embodiment of the present invention. This data structure may be used advantageously at step 68 (FIG. 3) for matching feature vectors of extracted objects to the feature vectors of objects that are provisioned in repository 30. The search approach that is embodied in this data structure assumes that every one of the vector elements in the feature vector of the extracted object must match the corresponding vector element in the stored feature vector to within a predetermined radius. The approach embodied in FIG. 5 thus differs from the distance measures defined above, which are summed over the vector elements and may be filtered to remove outliers. Although this approach is described here with reference to visual media objects, it may be used, alternatively or additionally, in searching for matching audio objects, as well as in fast searching through records of other sorts of vector data.

The data structure in FIG. 5 comprises a set of arrays 90, 92, 94, 96, 98, . . . , 100, 102, which are used to store pointers that lead sequentially to coarse feature vectors (CFV) 104, 106, . . . . The feature vectors are assumed to comprise M elements, labeled element 0 through element M−1 in the figure. Given an input coarse vector, the values of each element are quantized into a range of N possible values, labeled value 0 through value N−1. Thus, formally, each quantized CFV is an array of values $f_i$ of the form: $F=(f_0, f_1, \ldots, f_{M-1}) | f_i \in [0 \ldots (N-1)], i \in [0 \ldots (M-1)]$. Each array 90, 92, 94, 96, 98, . . . , 100, 102 corresponds to one of the elements 0, . . . , M−1 of the CFVs and is indexed by the quantized values 0, . . . , N−1 of that element. Entries 108 in each of arrays 90, 92, 94, 96, 98, . . . (but not in the final tier of arrays 100 and 102) contain pointers to entries in the next tier of arrays, as shown in the figure. Entries in final arrays 100, 102 point to leaves 104, 106, which contain records of the provisioned feature vectors themselves $CFV_1$, $CFV_2$, . . . $CFV_J$, $CFV_K$, etc., and the corresponding provisioned objects.

Arrays 90, 92, 94, 96, 98, . . . , 100, 102 are created in provisioning stage 36 (FIG. 2) as follows: To enter a new CFV in the data structure, content tracker reads the quantized value of element 0 of the CFV, $f_0$, and looks up the corresponding entry 108 in array 90 (which serves as the root array). If this entry is null, the content tracker creates a new array (filled initially with null values) in the second tier (for example, array 92), and puts a pointer to the new array in the entry 108 of array 90 corresponding to $f_0$. Otherwise, if there is an existing pointer in the $f_0$ entry 108 of array 90, the content tracker follows this pointer to array 92, and then looks up the entry in array 92 that corresponds to the quantized value of element 1 of the CFV, $f_1$. The content tracker then checks whether this entry is null or already contains a pointer, and continues on to the next array 96 in the manner described above. The content tracker proceeds in this way through the remaining elements of the CFV, $f_2, \ldots, f_{M-1}$. The pointer in the entry of array 100 in the final tier, corresponding to $f_{M-1}$, points not to another array, but rather to a leaf identifying the provisioned CFV itself (and the corresponding provisioned object).

In this manner, at the provisioning stage, the content tracker creates a tree of arrays 90, 92, 94, 96, 98, . . . , 100, 102, wherein each array in a given tier (except the final tier) may contain pointers to as many as N arrays in the next tier. Thus, for example, in FIG. 5 the $f_0+1$ entry of array 90 may point to another second-tier array 94, and so on. (In practice, however, the number of arrays in each tier will be smaller, particularly in the lower tiers.) As a result of this process, each provisioned CFV is associated with a certain path through the tree of arrays, culminating in the corresponding leaf. If two or more different CFVs have the same quantized feature vector, then they will share the same path.

Figure 6:
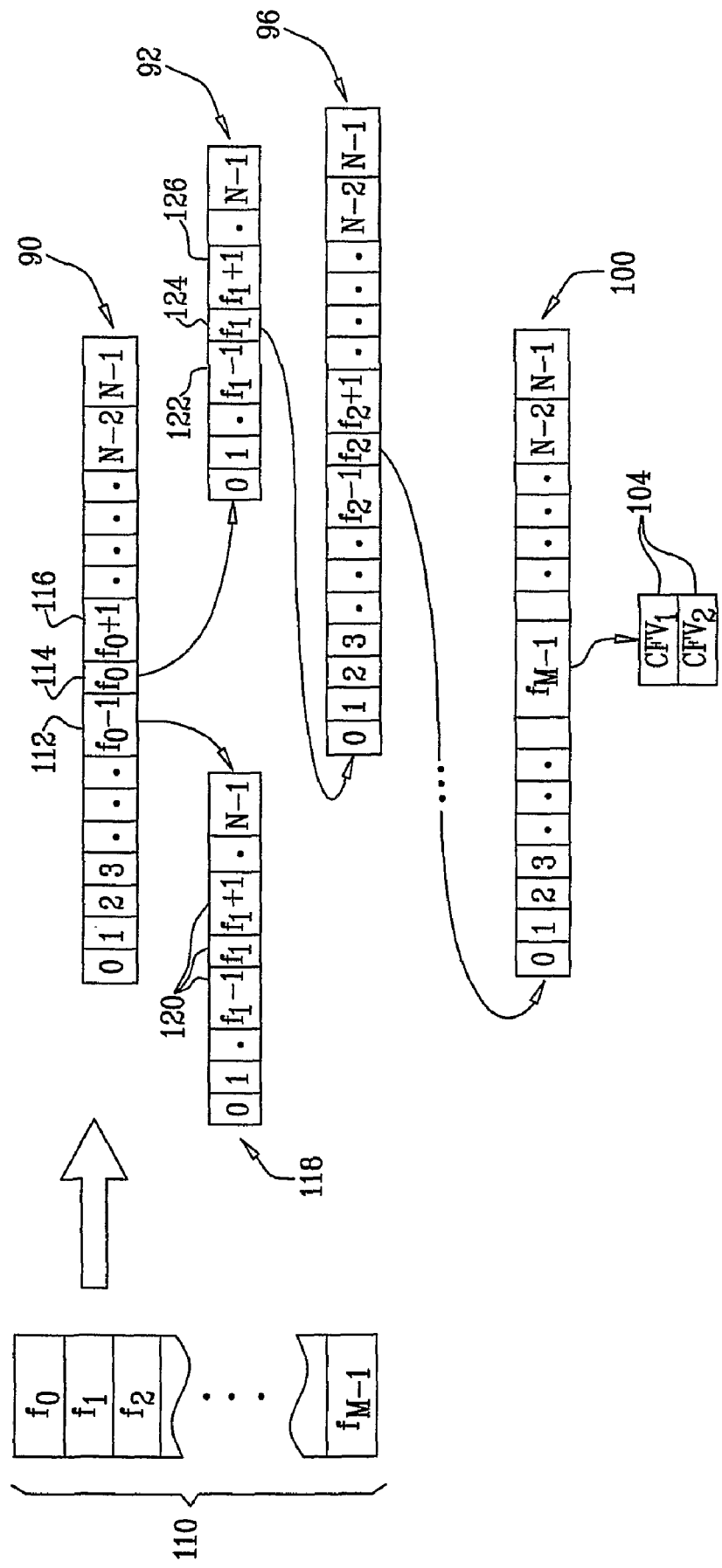
FIG. 6 is a block diagram that schematically illustrates a search for a match to a given feature vector using the data structure of FIG. 5, in accordance with an embodiment of the present invention.

FIG. 6 is a block diagram that schematically illustrates a method for traversing the data structure of FIG. 5 to match a quantized feature vector 110 of an object extracted from network traffic by content tracker 28, in accordance with an embodiment of the present invention. This method may be used in matching step 68 (FIG. 3). After computing and quantizing feature vector 110 of the extracted object, the content tracker looks up an entry 114 in root array 90 corresponding to the value of the first element, $f_0$, in quantized feature vector 110. In this example, it is assumed that the radius of tolerance permitted by the matching process between feature vector values is greater than the quantization step. In other words, provisioned CFVs whose feature vector elements have values within this radius of $f_0$, such as $f_0-1$, and $f_0+1$, are also considered as possible matching candidates. Therefore, the content tracker also looks up entries 112 and 116 to either side of entry 114 in array 90.

In the present example, entry 112 contains a pointer to an array 118, while entry 114 contains a pointer to array 92. Entry 116 is null, meaning that none of the provisioned video sequences have this value of element 0 in their feature vectors.

Content tracker 28 reads the next element of feature vector 110, $f_1$, and looks up the corresponding entries in arrays 118 and 92. In the present example, entries 120, 122 and 126 in array 118 are null, and the paths through the search tree that lead to these entries terminate at the second tier. Entry 124, however, contains a pointer to array 96. The content tracker therefore goes on to check the entry in array 96 that corresponds to the element of feature vector 110, $f_2$, and so on, until the search reaches the complete feature vectors $CFV_1$ and $CFV_2$ in leaves 104. In this way, the content tracker is able to reach all of the candidates for a possible match quickly and efficiently.

The candidates (if any) that are found in this manner are then subject to fine matching, at step 72 (FIG. 3). For efficient fine matching, the content tracker may sort the candidates according to their coarse distances from the extracted object, and perform the fine match starting with the closest candidate.

Optionally, the radius of tolerance surrounding $f_i$ may change dynamically in the following way: The content tracker may maintain a global maximum search radius ($R_{max}$) and several levels of tolerance, each defined by two numbers:
(1) a lower limit on the radius and
(2) the number of entries in the CFV that are allowed above this radius.

Thus, the content tracker may have L different levels, wherein $R_l$ defines the radius of level l, and $N_l$ defines the maximum number of elements allowed above $R_l$. The radii of the levels are sorted in descending order, and the number of allowed entries are sorted in ascending order, so that $R_l > R_{l+1} \geq 0$ and $0 < N_l < N_{l+1}$ for all l between 0 and L−2. A valid matching vector will have all elements up to $R_{max}$ and may have up to $N_l$ elements with deviation bigger than $R_l$ for all l from 0 to L−1. For example, taking L=2 and $R_{max}$=20% and $(R_l, N_l)$={(15%, 5), (10%, 10)}, a valid matching vector will have all elements up to 20% and may have up to five quantized elements with deviation bigger than 15% from the nominal value and up to ten elements with deviation bigger than 10%.

The search operation is conducted as described above, with the following changes: After computing and quantizing feature vector 110 of the extracted object, the content tracker looks up entry 114 in root array 90 corresponding to the value of the first element. The radius of tolerance for the first element is the largest permitted radius, i.e., the radius of $R_{max}$. Within this radius, the content tracker notes the distance $d_0$ of the matching element from the origin $f_0$. For each level l at which the distance is bigger than $R_l$ ($d_0 > R_l$), the number of allowed elements $N_l$ is reduced by one, so that $N_l$ becomes $N_l-1$. (If $N_l$ has dropped to zero, $N_l$ will never be reduced again because of how the radius is selected.) When searching each successive element of vector 110, the content tracker selects the lowest radius for which the corresponding $N_l$ is zero. If all $N_l$ are not zero, then $R_{max}$ is chosen. If $R_l$ was selected since $N_l$ is zero, then $d_i$ will be lower than $R_l$. Thus $d_i$ will not meet the condition above, and $N_l$ will not be reduced. This method allows matching feature vectors to be found with greater flexibility, even in the presence of some outliers.

In another alternative embodiment, additional termination criteria may be used based on an M-dimensional maximum allowed Euclidian distance. At each step of the search, the quantized square distance is calculated for each $d_i$. If the sum of the quantized square distances along the search path up to the current element is bigger than the total allowed Euclidean distance, then the search operation is terminated for this path.

Fine Matching Procedures

The technique that is used for fine matching at step 72 depends, inter alia, on the specific type of visual media that are to be matched. For example, if the extracted object in question comprises a single image frame, fine matching may be performed simply by comparing each of the pixel values in the extracted object (at a standard resolution, such as 64×64) with the corresponding pixel values in each candidate image that is stored in repository 30. If the measure of distances between the pixel values is less than a predetermined threshold, then the extracted object is considered to match the provisioned image. The distance measures in equations (2), (3) and (4), or a combined decision as in equation (6), for example, may be used for this purpose.

Fine matching of image sequences, such as video clips and animations, may also use this sort of pixel-by-pixel comparison. (In this context, the set of pixel values may be considered to serve as a fine feature vector.) The comparison may be carried out only with respect to the first image in the sequence, or it may also be applied to one or more subsequent images. Alternatively or additionally, fine and/or coarse feature vectors may be computed for some or all of the subsequent images in the extracted object and compared with the feature vectors of corresponding frames in the candidate provisioned sequences.

When multiple images in a sequence are to be compared, however, it is desirable that the image sequence of the extracted object be properly aligned with the provisioned image sequence. As noted earlier, in the course of transmission and retransmission of a video sequence over network 22, frames are commonly dropped from the sequence, so that proper alignment may require relative adjustment of the frame timing to compensate for the missing frames.

Figure 7:
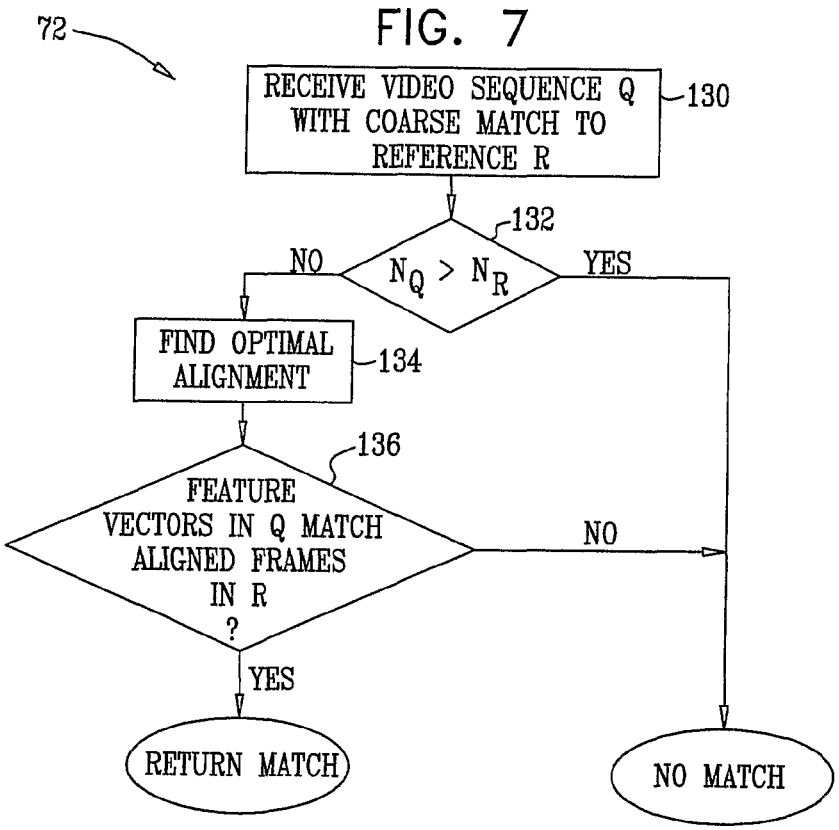
FIG. 7 is a flow chart that schematically illustrates a method for fine matching of image sequences, in accordance with an embodiment of the present invention.

FIG. 7 is a flow chart that schematically illustrates a method for fine matching of image sequences that adjusts for timing misalignment, in accordance with an embodiment of the present invention. The method attempts to match a "query sequence" Q to a "reference sequence" R and assumes that an initial matching procedure has identified R as a candidate match for Q, at a sequence reception step 130. Typically, the query sequence corresponds to the extracted object, while the reference sequence is one of the candidate provisioned objects. The initial matching procedure for finding the reference sequence may use coarse feature vectors, in the manner described above. Alternatively, the matching candidates used in the method of FIG. 7 may be identified by any other suitable procedure that is known in the art. Although the sequence matching technique of FIG. 7 is described here in the context of the operation of content tracker 28 in system 20, this technique may likewise be used in other applications in which video sequences with deviant timing must be aligned with one another.

Content tracker 28 checks the number of frames $N_q$ in the query sequence against the number of frames $N_r$ in the reference sequence, at a frame number checking step 132. It is assumed at this point that if the query sequence is a derivative of the reference sequence, $N_q$ cannot be greater than $N_r$, i.e., it is possible that frames were dropped from the original sequence in the course of transmission, but not that frames were added. Therefore, if $N_q$ is greater than $N_r$, the content tracker rejects the reference sequence as a possible match candidate without further processing. If the assumption is not valid, and still $N_q$ is greater than $N_r$, the roles of the reference and query vectors may be swapped before continuing to step 134.

As long as $N_q \leq N_r$, the content tracker attempts to find the optimal alignment between the query and reference sequences, at an alignment step 134. A method for alignment of this sort using dynamic time warping (DTW) is described hereinbelow. As a result of this alignment, each frame in the query sequence is uniquely paired with a corresponding frame in the reference sequence. The content tracker compares the feature vectors of the paired frames, at a vector matching step 136. This step may use the multi-frame comparison formula of equation (5), for example, to find the total difference between the query and reference sequences. Alternatively or additionally, the content tracker may compute some other distance measure. If the distance between the pairs of feature vectors is less than a predetermined threshold, the video sequences are considered to match. If there are multiple candidate sequences that satisfy the distance criterion at step 136, the reference sequence that is closest to the query sequence is typically chosen as the match.

Figure 8:
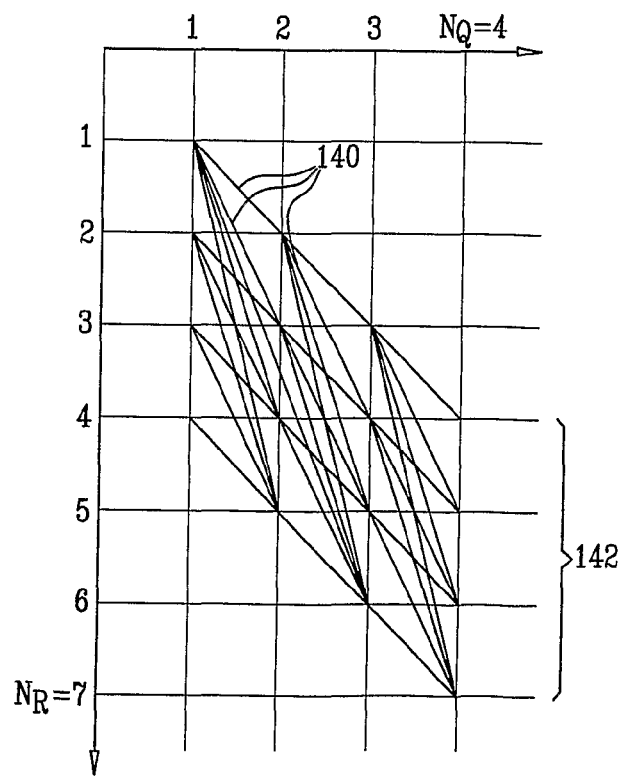
FIG. 8 is a graph that schematically illustrates a method for aligning a pair of image sequences, in accordance with an embodiment of the present invention.

FIG. 8 is a graph that schematically illustrates a method for image sequence alignment that may be used at step 134, in accordance with an embodiment of the present invention. In this example, $N_r=7$, while $N_q=4$. The method evaluates possible paths 140 that may link four out of the seven frames in the reference sequence in order to arrive at the sequence of four frames that best matches the four frames in the query sequence. The range of allowed paths, as explained hereinbelow, covers a span 142 in the reference frame space that is $N_r-N_q+1=4$ frames wide.

Step 134 uses an alignment function Fdtw: $Z^+ \mapsto Z^+$, which relates the indices ir of the frames of the reference sequence $Sr=\{1, 2, \ldots, N_r\}$ to the indices iq of the frames in the query sequence $Sq=\{1, 2, \ldots N_q\}$:

$$Fdtw(iq)=ir \quad (7)$$

Since Fdtw(•) is mathematically a function from the domain set Sq to the co-domain set Sr, it assigns a respective, single value of ir to every single value of iq. The connection of the aligned sequences points (iq, ir) defines a path 140. (Not all such paths are valid.) Fdtw is a strictly monotonic increasing function, i.e.:

$$iq_1 > iq_2 \Rightarrow ir_1 = Fdtw(iq_1) > ir_2 = Fdtw(iq_2)$$

$$iq_1, iq_2 \in Sq, ir_1, ir_2 \in Sr \quad (8)$$

Therefore, each step in Fdtw can be no greater than span 142:

$$0 < Fdtw(iq+1) - Fdtw(iq) \leq N_r - N_q + 1, 1 \leq iq < N_q \quad (9)$$

For each path, the total distance between the aligned feature vector sequences is defined by:

$$Dtotal(FIr, FIq) = \frac{1}{N_q} \sum_{iq=1}^{N_q} Dframe[FIr(Fdtw(iq)), FIq(iq)] \quad (10)$$

wherein FIr and FIq are the respective coarse feature vectors of the reference and query images Ir and Iq. At step 134, content tracker 28 finds the alignment function that minimizes the total distance between the aligned sequences over all valid paths:

$$Fdtw = \arg\min\{Dtotal(FIr, FIq)\} \quad (11)$$

valid paths

Equation (9) determines the number of valid paths that the content tracker must evaluate in order to choose the best path. For example if $N_r=N_q$, then $Fdtw(iq+1)-Fdtw(iq)=1$ for all iq in Sq, so there is only a single valid path (the straight line defined by $Fdtw(iq)=iq \forall iq \in Sq$). On the other hand, when the query sequence has a only single frame, $N_q=1$, it can match any of the $N_r$ reference frames unless additional constraints are imposed.

FIG. 8, as noted above, shows all valid paths for the case $N_r=7$ and $N_q=4$. In accordance with the constraints explained above, path segments parallel to the axes are forbidden. The number of valid points in each column is equal to $N_r-N_q+1$, and the number of possible branches backward in each column starts from one (at points where ir=iq) and grows by one with every incremental increase in ir for a given iq. This structure permits the alignment to be computed by an iterative procedure that runs over all the indices in Sq (i.e., all columns in FIG. 8) and calculates the minimal total distance terminating at each valid point in the graph. After the last column ($iq=N_q$) has been processed, the path terminating in this column with the minimal total distance (equation (10)) gives the best alignment. This method is expressed in pseudocode form in the table below:

TABLE I

SEQUENCE ALIGNMENT

```
/* Initialization previous array Dp[ ]*/
For ir=1, 2,..., Nr-Nq+1
    Dp[ir] = Dframe[FIr(ir), FIq(1)]
Copy Dp[ ] to Dc[ ]   /* for the case Nq=1 */
/* main loop */
For iq=2,..., Nq
{
    /* Calculate current frame distances */
    For ir=1, 2,..., Nr-Nq+1
        df[ir] = Dframe[FIr(ir+iq-1), FIq(iq)]
    /* find best valid path */
    Dmin=MaxPositive
    For ir=1, 2,..., Nr-Nq+1
    {
        If Dp[ir] < Dmin
            Dmin=Dp[ir]
        Dc[ir]=df[ir]+Dmin
    }
    /* update previous array */
    Copy Dc[ ] to Dp[ ]
}
/* Termination */
Dtotal = min{Dc[1], Dc[2],..., Dc[Nr-Nq+1]} / Nq
```

The alignment method shown above may be refined based on prior knowledge, if available, about the relation between the reference and query sequences. For example, if it is known that the first frames in the reference and query sequences must be aligned with one another, then the Dp[ ] array is initialized in the code above by setting Dp[1] to the distance between the first frames, and Dp[ir>1] to a large positive number to ensure that the first frames are aligned. If the mechanism of dropping frames is known, it may be reflected in a weighted distance:

$$Dtotal(FIr, FIq) = \frac{1}{Nq} \sum_{iq=1}^{Nq} W_{ir,iq} \cdot Dframe[FIr(ir), FIq(iq)] \quad (12)$$

The weight $W_{ir,iq}$ may be set to a higher value for large difference values (ir–iq), for example, if it is known that dropping many adjacent frames is unlikely.

The decision procedure may be accelerated by terminating the path calculation on certain paths even before the entire path has been computed, if the cumulative distance for the partial path is greater than some threshold. In this case, the content tracker may conclude immediately that the selected frames of the reference sequence that are represented by the path in question is not a good match for the query sequence, and need not complete the path computation for this path. Early termination of this sort may be conditioned on having traversed some minimal number of frames, for example, twenty frames, in the distance computation.

At step 136, the content tracker determines that the query sequence and reference sequence match if the total distance computed at step 134 is below a predefined threshold T. For this purpose, the total distance is normalized by $N_q$, as shown in the last line of Table I. As a result, the similarity measurement becomes more reliable as the number of frames grows larger. For small $N_q$ values, it may be desirable to increase the threshold. For example, the threshold may be increased to $T \cdot (1+\alpha/N_q)$, $\alpha > 0$.

Figure 9:
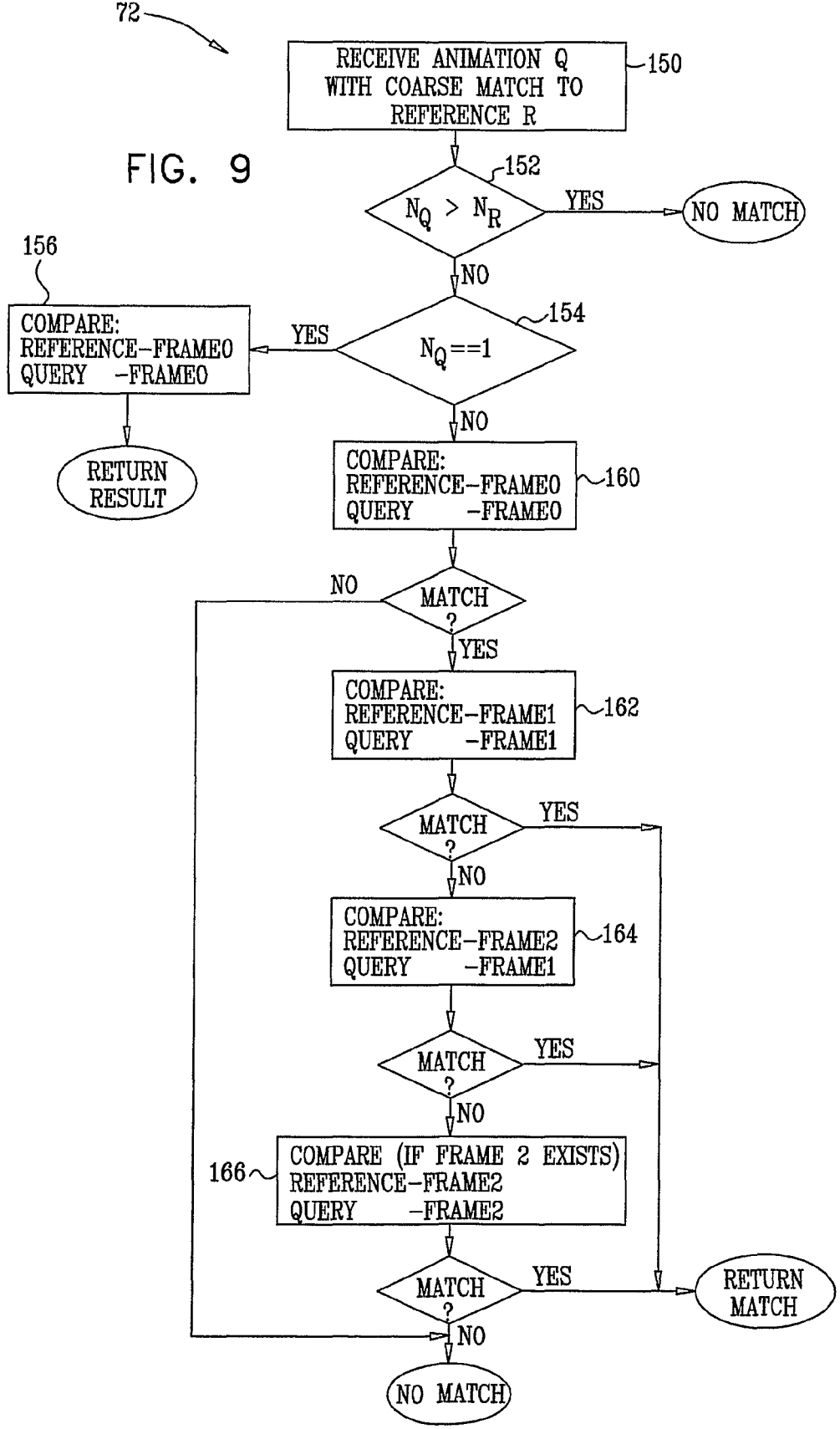
FIG. 9 is a flow chart that schematically illustrates a method for fine matching of image sequences, in accordance with an embodiment of the present invention.

FIG. 9 is a flow chart that schematically illustrates a method for fine matching of image sequences, in accordance with an alternative embodiment of the present invention. This method is based on fine vector matching for a small number of frames at the beginning of the query and reference sequences. (In the example shown in the figure, three frames are used: FRAME0, FRAME1 and FRAME2 in each sequence, but the method may be adapted for a greater or smaller number of frames.) The method of FIG. 9 is suited particularly for animation sequences, but may also be used for video sequences, either instead of or in addition to the DTW-based method described above. For example, the method of FIG. 9 may be used initially as a quick way of checking whether a given reference sequence matches the query sequence, and the content tracker may then proceed to the more complex DTW-based method only if the method of FIG. 9 does not find a match. (Among other advantages, the DTW-based method can cope with larger numbers of dropped frames following the first one.)

The method shown in FIG. 9 assumes that if the query sequence is to match a given reference sequence, then the query sequence must contain the same first frame as the reference sequence. Thus, the first frames of the query and reference sequence must match. Subsequent frames of the reference sequence may be dropped from the query sequence. Therefore, the second frame of the query sequence is compared to both the second and the third frames of the reference sequence.

The content tracker initiates the method upon receiving a query sequence (extracted object) and a reference sequence (a provisioned object in repository 30) that is a candidate to match the query sequence, at a sequence input step 150. In other words, the coarse comparison performed at step 68 (FIG. 3) found a match between the coarse feature vectors of the initial images in the query sequence and the reference sequence. The content tracker checks whether the query sequence has a greater number of frames than the reference sequence, at a frame number checking step 152. If so, there can be no match between the sequences, for the reasons explained above with reference to step 132 (FIG. 7), and the reference sequence is rejected.

The content tracker next checks whether the query sequence contains only a single frame ($N_q$=1), at an image checking step 154. If so, the single image in the query sequence is compared to the first (and possibly only) frame in the reference sequence, at an image comparison step 156. For example, the distance between the query and reference images may be computed using the distance measure in equation (2), (3) or (4), or some combination of such measures, as explained above. If the distance is less than a predefined bound, the content tracker determines that the query sequence matches the reference sequence.

If the query sequence contains two or more frames, the content tracker checks the first frame (FRAME0) in the query sequence against the first frame in the reference sequence, at a first frame comparison step 160. If these frames match to within a predefined bound, the content tracker goes on to check the second frame (FRAME1) in the query sequence against the second frame in the reference sequence, at a second frame comparison step 162. If the second frames match, as well, the content tracker determines that the query sequence matches the reference sequence.

Otherwise, if the match result of step 162 is negative, the content tracker goes on to check the second frame of the query sequence against the third frame (FRAME2) of the reference sequence, at a second/third frame comparison step 164. If these frames do not match, the content tracker checks the third frame of the query sequence (if there is such a frame) against the third frame of the reference sequence, at a third frame checking step 166. If a match is found at either step 164 or step 166, the content tracker concludes that the query sequence matches the reference sequence. Otherwise, the content tracker may reject the reference sequence for failing to match the query sequence or, alternatively, it may go on to attempt a more complex matching procedure, such as the DTW-based method of FIG. 7.

As another alternative, the method of FIG. 9. can be used as a fast screening method. If this method returns no match, the content tracker rejects the reference sequence. Otherwise, the content tracker proceeds to apply the DTW-based method in order to check the full sequence.

The methods described above for distance computation between image frames (in both the fine and coarse matching stages) may be sensitive to variations in image intensity. Changing image brightness, for example, adds a constant to all the pixel values, which will change the distance measure between images considerably. In order to avoid missing matches as a result of such intensity variations, the pixel values of the images in repository 30 may be normalized to the statistical characteristics of the corresponding images in each extracted object before matching. The normalized images may be computed on the fly, as part of the matching procedure, or a set of normalized images may be prepared in advance for each provisioned object. Further alternatively, the images in the extracted objects may be normalized to the statistical characteristics of the corresponding images in the repository. As yet another option, normalization may be applied to the feature vectors, rather than to the images themselves.

A histogram equalization or other histogram stretch procedure may be used to normalize the images. For example, the content tracker may modify each image x in repository 30 by linear transformation x'=ax+b1, wherein a and b are scalars, and 1 is a matrix of ones. (For convenience, x and 1 may alternatively be represented as column vectors of length N, wherein N is the total number of pixel values in the image, for example N=64×64×3 for the fixed-resolution RGB images described above.) The optimal linear transformation, which produces the minimal square error between a tested image y and x, is given by:

$$\min E = \min(y - ax - b1)^T (y - ax - b1) \quad (13)$$

The solution to this optimization problem is given by:

$$a = (y^T x - N \cdot my \cdot mx)/(x^T x - N \cdot mx^2)$$

$$b = my - a \cdot mx \quad (14)$$

wherein mx and my are the mean values of images x and y, respectively. The values $x^T x$ and mx can be calculated offline, so that only the inner product $y^T x$ and the mean value my need be computed in real time.

If E is smaller than a predefined threshold, the content tracker may decide that the images match. The allowable range of adjustment of the parameters may be limited, however, to avoid problematic situations such as matching a black image to a white image. This matching technique may also be applied, *mutatis mutandis*, to the coarse feature vectors.

The fine matching procedure may also take image cropping and scaling into account. When image cropping was applied at the original resolution (without a resizing operation before or after the crop operation), the scaling may be aligned. For this purpose, at the provisioning phase, the content tracker may save the horizontal and vertical resizing factors, Rh, Rv, that are needed to change the resolution of each reference image to the appropriate scale (for example, to a fixed resolution, such as 64×64). The query image is then resized with the same factors, so that the image features are scaling aligned. The content tracker then computes the fine match distance using overlapping area of the query and reference images with different horizontal and/or vertical shifts between the images. The shift that gives the minimal distance is take to be the correct one.

If the scaling factor of the query image is unknown, the content tracker searches the minimal distance is searched over two dimensions: different scaling factors and different horizontal and/or vertical shifts. If it is known that the cropping is centered then there is no need to search over horizontal or vertical shifts.

Matching of Audio Media

Tracking of audio content in system 20 follows similar lines to those described above with regard to visual content. Content tracker 28 typically provisions audio objects in repository 30 by computing and storing a feature vector for each object. The feature vector comprises an array of digital values, which may correspond to either time-domain and/or frequency-domain data regarding a selected time window or windows in the audio object. Upon extracting an audio object from the data transmitted over network 22, the content tracker computes a similar feature vector for the extracted object, and then searches repository 30 for a match. In the case of audio objects, unlike the visual media described earlier, this sort of vector matching may be sufficient to find fine matches for the purposes of content tracking, without an additional coarse matching stage. Alternatively, the procedures described hereinbelow may be preceded by a coarse matching stage to reject non-relevant material and produce a short candidate list, as described above in reference to matching of visual content.

An item of audio content may undergo substantial deformation as it is transmitted and retransmitted over network 22, leading to changes in timing, bandwidth, gain and other properties of the audio data. Sources of this deformation may include:

Decimation of the digital signal, causing loss of bandwidth, which increases in severity with the decimation depth.

Nonlinear distortions due to lossy compression formats used by different codecs and/or different bit-rates. Common compression formats include parametric coding (such as AMR), wave coding (ADPCM), and psychoacoustic coding (MP3, AAC).

Signal gain change (usually constant over the entire signal).

Phase shift and phase reversal, typically caused by filtering elements.

Cropping, particularly at the clip end, typically in order to meet size constraints.

Conversions between different sample resolutions, such as from 16 bits/sample to 8 bits/sample, and vice versa.

Conversion from stereophonic to monophonic recording.

In the embodiments described hereinbelow, content tracker 28 computes and matches feature vectors in a manner that is relatively insensitive to the above deformations. Methods that may be used for this purpose are described in detail hereinbelow.

Figure 10:
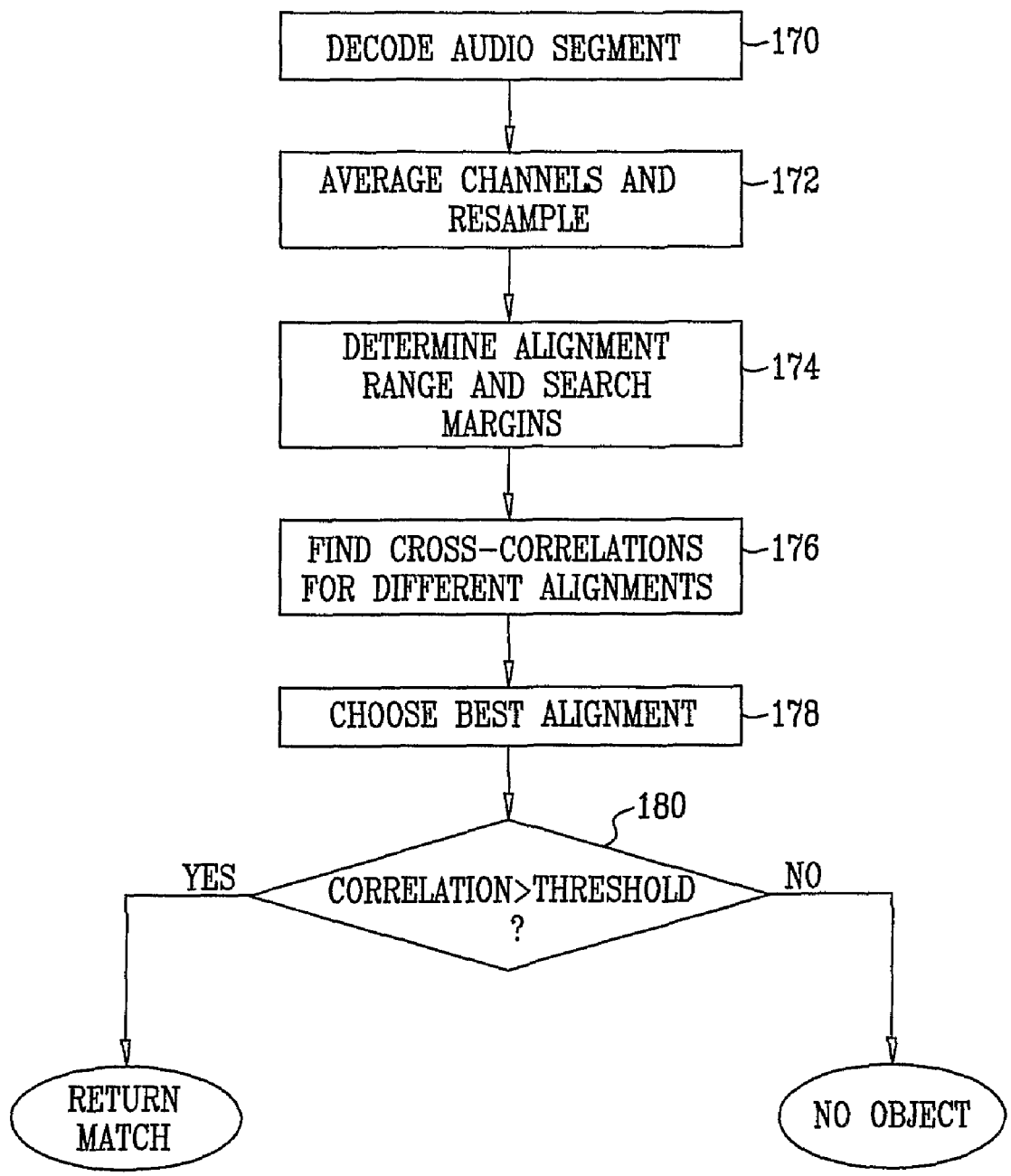
FIG. 10 is a flow chart that schematically illustrates a method for matching audio media objects, in accordance with an embodiment of the present invention.

FIG. 10 is a flow chart that schematically illustrates a method for matching items of audio content, in accordance with an embodiment of the present invention. Upon extracting an audio object from network traffic, content tracker 28 decodes at least an initial segment of the object, at a decoding step 170. The content tracker resamples the decoded signals, so that all extracted objects and stored audio objects have the same sampling rate, at a resampling step 172. For example, the signals may all be sampled at $F_S$=5000 samples/sec, although higher or lower sampling rates may also be used. If the audio signal comprises multiple channels (i.e., stereo), the content tracker typically averages the channels before resampling.

In order to match the extracted object to audio objects that are provisioned in repository 30, content tracker 28 attempts to correlate a selected time segment of the object with a corresponding segment of each of the provisioned objects. For purposes of matching, the content tracker defines an alignment range within each provisioned object, and then selects a segment from the extracted object that is longer than the alignment range for matching against the alignment range in the provisioned object, at a range selection step 174. In other words, the alignment range starts at a time S=alignment_start_point and has a duration L=alignment_length. The sequence of samples in the alignment range that is defined in this way, with a fixed start point and sampling rate, may be seen as a time-domain feature vector, with $L \cdot F_S$ elements.

The segment selected from the extracted object has added search margins of length M before and after the alignment range, on the assumption that the relative time shift of the extracted object relative to the original, provisioned clip may vary over (−M:M). Thus, for the purposes of correlation, the content tracker selects a segment of the extracted object starting at S−M and ending at S+L+M. In an exemplary embodiment, L=S=5 sec, and M=0.5 sec. Longer L and M, such as L=10 sec, may produce better matching results, at the expense of higher computational complexity. On the other hand, the inventors have used smaller margins, as low as 0.1 sec, with good results. Alternatively, the content tracker may select a segment of length L from the extracted object and segments with added search margins from the provisioned objects.

As yet another option, useful particularly in handling short signals, as well (as short as 5 sec), both the starting point S and the alignment length L can be dynamically selected, and the values of these parameters may be used as a part of the fingerprint. For signals as short as 5 sec, for example, the values S=0.1 sec, L=4.8 sec, and M=0.1 sec may be used. For longer signals, the content tracker may select larger values. (Large S values are helpful in "stepping over" silent, or nearly silent, periods, which are common at the beginning of long signals.) For a given query signal, the content tracker extract the fingerprint starting at the minimal S value and continuing for long enough in order to cover all the possible candidates in the database. Only candidates having a sufficient overlap of the fingerprint (for example, 4.8 sec) will be considered as a possible match. This adaptive signature length may be used in conjunction with an adaptive decision threshold in order to maintain a low false-matching rate over all lengths.

To choose the best alignment between the extracted object and a given provisioned object, the content tracker measured the cross-correlation between the feature vectors of the extracted object and the provisioned object for multiple different alignments, at a correlation computation step 176. For each value of a relative shift k, the content tracker computes the cross-correlation between the selected segment of length L from the provisioned object and a corresponding window of length L within the longer selected segment of the extracted object. For each shift value, the content tracker calculates the absolute correlation factor as follows:

$$c(k) = \left| \frac{\sum_{n=0}^{L-1} ref(S+n) \cdot quer(S-M+k+n)}{L \cdot \text{ref\_std} \cdot \text{quer\_std}(k)} \right| \quad (15)$$

Here ref(•) and quer(•) represent the audio samples of the reference (provisioned) segment and the query (extracted) segment, while ref_std and quer_std(k) are the respective standard deviations of the segments. Alternatively, quer_std may be computed only once by assuming that the energy is relatively constant over the entire segment. Further alternatively, as noted above, the segment of length L may be taken from the query segment, and the search margins and relative shift may be applied to the reference segment.

For each provisioned object that is tested at step 176, content tracker 28 chooses the highest value of c(k) over all values of k, at a alignment selection step 178. This value of k is considered to be the optimal alignment for the extracted object in question. The content tracker checks the value of the correlation c(k) against a predefined threshold, at a correlation checking step 180. If c(k) is above threshold, the provisioned object is considered a candidate match for the extracted object. If multiple provisioned objects are found to have high correlation values, the candidate with the highest correlation value is typically selected as the matching clip. Otherwise, if there is no provisioned object that gives a correlation value above threshold, the content tracker concludes that the extracted object does not match any of the audio objects in repository 30.

Figure 11:
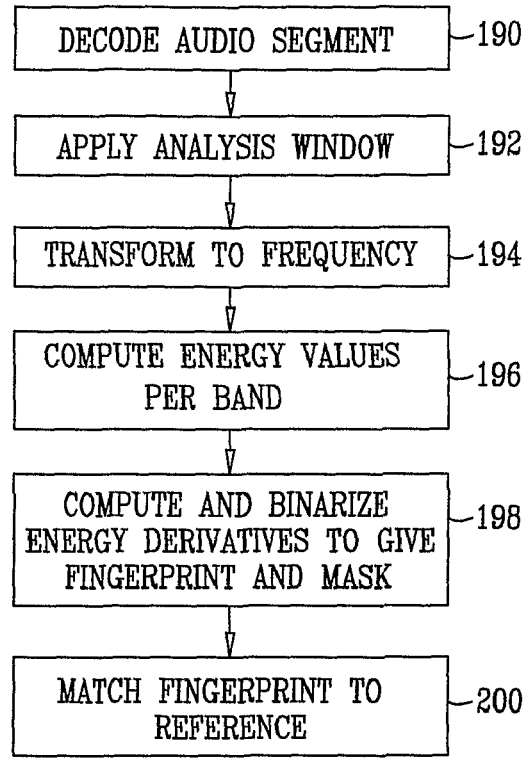
FIG. 11 is a flow chart that schematically illustrates a method for matching audio media objects, in accordance with another embodiment of the present invention.

FIG. 11 is a flow chart that schematically illustrates a method for matching items of audio content, in accordance with another embodiment of the present invention. This method uses a measure of energy variation over time, in the form of frequency-domain energy derivatives, in computing the feature vectors of the reference and query segments. Content tracker 28 decodes a selected time segment of fixed length at the beginning of each extracted audio object, and resamples the segment at a fixed sampling rate, at a decoding step 190. This step is performed in a similar manner to steps 170 and 172 in FIG. 10. The provisioned objects in repository 30 are resampled in the same manner, and their feature vectors, in the form of combined time/frequency-domain "fingerprints," are pre-computed using the steps described below. Search margins are added to the selected segments of either the extracted or the provisioned objects, as described above in reference to step 174.

Content tracker 28 divides the selected time segment of the extracted object into sections of a predetermined length, for example, 2048 samples. The sections may overlap one another. For example, each section may be shifted relative to the preceding section by 64 samples. The content tracker applies an analysis window h(n), such as a Hamming or Hanning window, to each section, at a windowing step 192, thus giving a windowed section $x_h(n)=x(n) \cdot h(n)$, n=0, 1, . . . , 2047. This windowed section is transformed into the frequency domain, $X(k)=FFT\{x_h(n)\}$, using a real Fast Fourier Transform (FFT) of size 2048, for example, at a frequency transformation step 194.

To find the fingerprint, the content tracker transforms the FFT values into energy values: $E(k)=|X(k)|^2$. It divides these energy values into predetermined frequency bands, at a band computation step 196. For example, in one embodiment, the content tracker divides the frequency range 50-1750 Hz into thirty-three bands and calculates the band energy by summing twenty-one energy values within each of the bands i for each time window t:

$$E_B(i, t) = \sum_k E(k), k \in \text{Band } i \quad (16)$$

Alternatively, other frequency bands may be used.

Further alternatively or additionally, other window characteristics and frequency transforms may be used, as are known in the art. For example, to reduce the computational cost of the FFT, the content tracker may use short time windows, containing no more than 512 samples. In one embodiment, the content tracker uses windows that are 128 samples long, each shifted by 64 samples relative to the preceding window. The content tracker applies a FFT of size 128 to each window, followed by energy computation as explained above. Each spectral energy component is then smoothed by averaging the component over a certain number of successive windows, for example, ten windows, and the band energy values are extracted as defined above.

The content tracker uses the band energy values to compute a digital derivative, both between the successive frequency bands and between successive windows, at a fingerprint computation step 198:

$$D(i,t) = [E_B(i,t) - E_B(i-1,t)] - [E_B(i,t-1) - E_B(i-1,t-1)] \quad (17)$$

To simplify subsequent matching computations, the content tracker may transform the derivative into a binary format:

$$B(i, t) = \begin{cases} 0 & D(i, t) < 0 \\ 1 & D(i, t) \geq 0 \end{cases} \quad (18)$$

By taking only the sign of the derivative, the content tracker eliminates the need to resolve differences in gain between the query and reference segments. Modifications that may be applied to further enhance the reliability of the fingerprint and matching computation are described hereinbelow.

Content tracker 28 matches this fingerprint to the fingerprints of the audio objects in repository 30, at a matching step 200. The match computation is based on a binary distance measure, such as the Hamming distance, which counts the number of differences between the bits of the query fingerprint and the bits of the reference fingerprint. This distance can be computed efficiently by a bitwise XOR operation over the fingerprints, followed by summation. Typically, the distance is computed for multiple different relative alignments of the vectors, and the smallest distance value is chosen and compared to a predetermined threshold. The content tracker generally decides that the extracted object is a match for the provisioned object that has the lowest sub-threshold distance.

The method of FIG. 11 has been found to give good accuracy in matching query and reference segments. As noted earlier, appropriate choices of operating parameters, such as the use of short time windows, permit the content tracker to achieve accurate matching results without the high computational complexity that characterizes some of the matching methods that have been used in the prior art.

Additionally or alternatively, the content tracker may compute a binary mask for the fingerprint of each provisioned audio object:

$$M(i, t) = \begin{cases} 0 & |D(i, t)| < \text{threshold} \\ 1 & |D(i, t)| \geq \text{threshold} \end{cases} \quad (19)$$

The feature vector in this case may be seen as comprising two bits per energy band, as opposed to the binary fingerprint of equation (18). The threshold in equation (19) may be set to a predetermined value, or it may be determined adaptively, so that the mask contains a certain predetermined percentage of ones (or of zeros). Only those bits i for which M=1 in the reference strings are taken into account in the distance computation. Masking out of low derivative values in this manner reduces errors in the distance computation.

Alternatively or additionally, masking of this sort may be applied according to the energy distribution of the reference signal. As a result, time/frequency areas in which the energy content is lower than some predefined threshold will be masked out. Further additionally or alternatively, the energy content of the signal may be used in selecting the starting point S. For example, the starting point may be chosen so that the fingerprint starts only after a leading silent segment.

Figure 12:
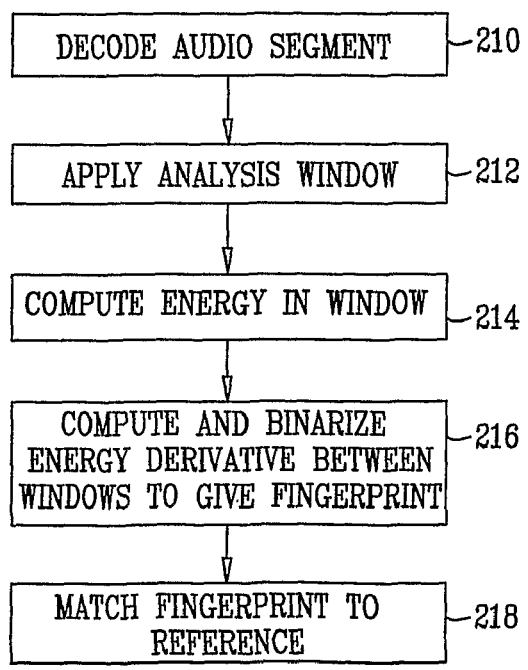
FIG. 12 is a flow chart that schematically illustrates a method for matching audio media objects, in accordance with yet another embodiment of the present invention.

FIG. 12 is a flow chart that schematically illustrates a method for matching items of audio content, in accordance with still another embodiment of the present invention. This method, like the method of FIG. 11, uses a measure of energy variation over time, but in this case the binary fingerprint is based on time-domain energy derivatives, with lower computational complexity than the frequency-domain method of FIG. 11. As in the preceding method, content tracker 28 decodes and resamples each audio segment that is to be matched, at a decoding step 210. It then applies an analysis window to each of a sequence of sections of the segment, at a windowing step 212. For example, the content tracker may apply a Hamming window to overlapping sections of length 2048 samples, wherein each section is shifted by 64 samples relative to the preceding section.

The content tracker computes the total energy in each window, at an energy computation step 214. The energy is computed by summing the square values of the windowed samples. The content tracker then calculates the time derivative of the energy, at a derivative computation step 216. The time derivative values may be binarized, as in equation (18), to give a binary fingerprint. A mask may also be computed at the provisioning stage, as given by equation (19). (In this case, however, the index i is omitted from equations (18) and (19).) The content tracker matches the fingerprint (with or without the mask) against the fingerprints of the provisioned audio clips in repository 30, at a matching step 218. This step may be performed by computing Hamming distances for different alignments, similar to that described above at step 200 in FIG. 11.

Alternatively, a larger number of the bits of the derivative computed at step 216 may be used in the feature vector. In one embodiment, the derivative may even be computed as a floating point value. In this case, the matching computation may be based on correlation of the feature vectors, as in equation (15), rather than binary distances.

Further alternatively, content tracker 28 may use features of other types to characterize and match audio objects. For example, the content tracker may use Mel Cepstral coefficients (as described in the above-mentioned provisional patent application) or other features that are known in the art.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for matching media objects, comprising:
receiving a plurality of reference objects, each reference object comprising a respective first sequence of reference image frames;
computing respective reference feature vectors of one or more of the reference image frames in each of the reference objects;
receiving a query object, comprising a second sequence of query image frames;
computing a respective query feature vector of at least one of the query image frames;
searching the reference feature vectors to find one or more candidate objects among the reference objects, using a coarse matching criterion to match a respective reference feature vector of one of the reference image frames in each of the one or more candidate objects to the query feature vector;
comparing at least one additional reference image frame, which follows the one of the reference image frames in each of the one or more candidate objects, to at least one additional query image frame, which follows the at least one of the query image frames in the query object, using a fine matching criterion, different from the coarse matching criterion, in order to determine that one of the candidate objects is a match for the query object; and
outputting a record of the match,
wherein computing the respective reference feature vectors and query feature vector comprises computing multiple feature vectors of at least one frame from among the reference image frames and the query image frames, the multiple feature vectors corresponding to different base characteristics of the query image frames relative to the reference image frames,
wherein the base characteristics are selected from a group of image characteristics consisting of an aspect ratio, image borders, scaling, and shift, and
wherein searching the reference feature vectors comprises identifying, responsively to the base characteristics, a conversion to be applied to one or more of the query and candidate objects in order to satisfy the coarse matching criterion.

2. The method according to claim 1, wherein computing the respective reference and query feature vectors comprises dividing at least one of the reference image frames and the at least one of the query image frames into a predetermined set of blocks, and computing a feature of each of the blocks.

3. The method according to claim 2, wherein the feature comprises an average color value.

4. The method according to claim 1, wherein receiving the query object comprises extracting the query object from a transmission over a communication network.

5. The method according to claim 4, wherein the communication network comprises a telephone network, and wherein the transmission comprises a multimedia message transmitted over the telephone network.

6. The method according to claim 4, wherein the query object comprises an instance of one of the reference objects that has been modified in the transmission over the communication network, and wherein searching the reference feature vectors comprises compensating for modification of the query object so as to identify the one of the reference objects from which the query object is derived.

7. The method according to claim 1, wherein searching the reference feature vectors comprises adjusting at least one of the reference and query feature vectors to compensate for a change in aspect ratio of the query image frames relative to the reference image frames of one of the reference objects from which the query object is derived.

8. The method according to claim 7, wherein the query image frames comprise borders as a result of the change in the aspect ratio, and wherein searching the reference feature vectors comprises removing the borders in order to find the one or more candidate objects.

9. The method according to claim 1, wherein the feature vectors comprise multiple vector elements having respective values, and wherein computing the respective reference feature vectors comprises quantizing the respective values of the vector elements and building a search tree comprising multiple tiers of arrays corresponding respectively to the vector elements of the feature vectors, each array comprising pointers to the arrays in a subsequent tier of the search tree, wherein the pointers are indexed by the respective quantized values of the vector elements, and
wherein searching the reference feature vectors comprises traversing the search tree using the quantized values of the vector elements of the query feature vector as indices, and
wherein traversing the search tree comprises specifying a radius of tolerance, and using additional values of the vector elements that are within the radius of the values of the vector elements of the query feature vector as additional indices to traverse further branches of the search tree.

10. The method according to claim 1, wherein searching the reference feature vectors comprises finding a match between the respective reference feature vector of a first reference image frame and the respective query feature vector of a first query image frame, and wherein applying the fine matching criterion comprises computing and comparing respective query feature vectors of one or more of the query image frames following the first query image frame to the respective reference feature vectors of the one or more of the reference image frames following the first reference image frame.

11. The method according to claim 1, wherein comparing the at least one additional reference image frame comprises aligning the first and second sequences, and comparing the aligned sequences,
wherein aligning the first and second sequences comprises associating each of a plurality of the query image frames with a respective one of the reference image frames, while at least one of the reference image frames in the first sequence has no query image frame associated therewith due to dropping of one or more of the query image frames from the first sequence of the reference image frames of one of the reference objects from which the query object is derived.

12. The method according to claim 11, wherein associating each of the plurality of the query image frames with the respective one of the reference image frames comprises applying dynamic time warping to at least one of the first and second sequences.

13. The method according to claim 1, wherein computing the respective query feature vector comprises identifying one or more constant-color frames from a beginning of the second sequence, and computing the respective query feature vector of at least one of the query image frames following the constant-color frames.

14. The method according to claim 1, wherein comparing the at least one additional reference image frame comprises applying the conversion to one or more of the additional query and reference image frames and then applying the fine matching criterion.

15. The method according to claim 1, wherein using the fine matching criterion comprises:
performing a comparison between the at least one additional query image frame in the second sequence and a corresponding additional reference image frame in the first sequence; and
if the comparison between the at least one additional query image frame and the corresponding additional reference image frame does not yield a match, retrying the comparison between the at least one additional query image frame and one subsequent additional reference image frame, following the corresponding additional reference image frame in the first sequence.

16. Apparatus for matching media objects, comprising:
a memory, which is arranged to store a plurality of reference objects, each reference object comprising a respective first sequence of reference image frames; and
a content tracker, which is configured to compute respective reference feature vectors of one or more of the reference image frames in each of the reference objects, and upon receiving a query object comprising a second sequence of query image frames, to compute a respective query feature vector of at least one of the query image frames, and to search the reference feature vectors to find one or more candidate objects among the reference objects, using a coarse matching criterion to match a respective reference feature vector of one of the reference image frames in each of the one or more candidate objects to the query feature vector, and to compare at least one additional reference image frame, which follows the one of the reference image frames in each of the one or more candidate objects, to at least one additional query image frame, which follows the at least one of the query image frames in the query object, using a fine matching criterion, different from the coarse matching criterion, in order to determine that one of the candidate objects is a match for the query object, and to output a record of the match,
wherein the content tracker is configured to compute multiple feature vectors of at least one frame from among the reference image frames and the query image frames, the multiple feature vectors corresponding to different base characteristics of the query image frames relative to the reference image frames,
wherein the base characteristics are selected from a group of image characteristics consisting of an aspect ratio, image borders, scaling, and shift, and
wherein the content tracker is configured to identify, responsively to the base characteristics, a conversion to be applied to one or more of the query and candidate objects in order to satisfy the coarse matching criterion.

17. A computer software product, comprising a tangible, non-transitory computer-readable medium in which program instructions are stored, which instructions, when read by a computer, cause the computer to store a plurality of reference objects, each reference object comprising a respective first sequence of reference image frames, to compute respective reference feature vectors of one or more of the reference image frames in each of the reference objects, and upon receiving a query object comprising a second sequence of query image frames, to compute a respective query feature vector of at least one of the query image frames, and to search the reference feature vectors to find one or more candidate objects among the reference objects, using a coarse matching criterion to match a respective reference feature vector of one of the reference image frames in each of the one or more candidate objects to the query feature vector, and to compare at least one additional reference image frame, which follows the one of the reference image frames in each of the one or more candidate objects, to at least one additional query image frame, which follows the at least one of the query image frames in the query object, using a fine matching criterion, different from the coarse matching criterion, in order to determine that one of the candidate objects is a match for the query object, and to output a record of the match,
wherein the instructions cause the computer to compute multiple feature vectors of at least one frame from among the reference image frames and the query image frames, the multiple feature vectors corresponding to different base characteristics of the query image frames relative to the reference image frames,
wherein the base characteristics are selected from a group of image characteristics consisting of an aspect ratio, image borders, scaling, and shift, and
wherein the instructions cause the computer to identify, responsively to the base characteristics, a conversion to be applied to one or more of the query and candidate objects in order to satisfy the coarse matching criterion.

18. A method for matching media objects, comprising:
receiving a plurality of reference objects, each reference object comprising a respective first sequence of reference image frames;
computing respective reference feature vectors of one or more of the reference image frames in each of the reference objects;
receiving a query object, comprising a second sequence of query image frames;
computing a respective query feature vector of at least one of the query image frames;
searching the reference feature vectors to find one or more candidate objects among the reference objects, using a coarse matching criterion to match a respective reference feature vector of one of the reference image frames in each of the one or more candidate objects to the query feature vector;
comparing at least one additional reference image frame, which follows the one of the reference image frames in each of the one or more candidate objects, to at least one additional query image frame, which follows the at least one of the query image frames in the query object, using a fine matching criterion, different from the coarse matching criterion, in order to determine that one of the candidate objects is a match for the query object; and
outputting a record of the match,
wherein using the fine matching criterion comprises:
performing a comparison between the at least one additional query image frame in the second sequence and a corresponding additional reference image frame in the first sequence; and
if the comparison between the at least one additional query image frame and the corresponding additional reference image frame does not yield a match, retrying the comparison between the at least one additional query image frame and one subsequent additional reference image frame, following the corresponding additional reference image frame in the first sequence.

* * * * *